(12) United States Patent
Johnson

(10) Patent No.: US 11,408,573 B1
(45) Date of Patent: Aug. 9, 2022

(54) OPTICAL PROJECTION DEVICE

(71) Applicant: BLISSLIGHTS LLC, Oceanside, CA (US)

(72) Inventor: Randy E. Johnson, Vista, CA (US)

(73) Assignee: BlissLights LLC, Oceanside, CA (US)

( * ) Notice: Subject to any disclaimer, the term of this patent is extended or adjusted under 35 U.S.C. 154(b) by 0 days.

(21) Appl. No.: 17/516,294

(22) Filed: Nov. 1, 2021

Related U.S. Application Data

(60) Provisional application No. 63/247,500, filed on Sep. 23, 2021.

(51) Int. Cl.
*F21S 10/00* (2006.01)
*F21V 5/00* (2018.01)
(Continued)

(52) U.S. Cl.
CPC ............. *F21S 10/007* (2013.01); *F21V 5/00* (2013.01); *F21V 5/007* (2013.01); *F21V 5/04* (2013.01); *G02B 5/18* (2013.01); *F21Y 2105/10* (2016.08); *F21Y 2115/10* (2016.08); *G02B 2005/1804* (2013.01)

(58) Field of Classification Search
CPC .... F21V 5/04; F21V 5/007; F21V 5/00; F21S 10/007; G02B 5/18
See application file for complete search history.

(56) References Cited

U.S. PATENT DOCUMENTS 2,230,039 A 1/1941 Chester
2,959,094 A 11/1960 Kosma
(Continued)

FOREIGN PATENT DOCUMENTS

GB 1396108 6/1975
GB 2592484 9/2021
(Continued)

OTHER PUBLICATIONS

Complaint, *Shenzhen Bolong Technology Co. Ltd. v. Blisslights, LLC*, Case No. 3:21-cv-01524-GPC-KSC, Doc. 1 (S.D. Cal.), Aug. 27, 2021, 3 pages.
(Continued)

*Primary Examiner* — Rajarshi Chakraborty
*Assistant Examiner* — Nathaniel J Lee
(74) *Attorney, Agent, or Firm* — Fish & Richardson P.C.

(57) ABSTRACT

The present disclosure is directed to projection devices that can project patterned light of different colors. In one implementation, the projection device can include a housing, within which reside multiple components. These components can include light emitting diodes (LEDs), a parabolic mirror reflector, a sinusoidal lenticular diffuser, and multiple spatial filters. The multiple LEDs can be provided in at least two distinct colors. The parabolic mirror reflector can be arranged to collimate light received from the multiple LEDs. The sinusoidal lenticular diffuser can be positioned at an output of the parabolic mirror reflector and arranged to diffuse the collimated light. The spatial filters can be arranged to diffuse the diffused and collimated light received from the sinusoidal lenticular diffuser. An imaging lens can be coupled to the housing and arranged to magnify the diffused light received from the spatial filters and display a cloud-like effect on a first surface.

25 Claims, 13 Drawing Sheets

(51) Int. Cl.
*G02B 5/18* (2006.01)
*F21V 5/04* (2006.01)
*F21Y 115/10* (2016.01)
*F21Y 105/10* (2016.01)

(56) References Cited

U.S. PATENT DOCUMENTS

| | | | |
|---|---|---|---|
| 3,645,439 | A | 2/1972 | Bellis |
| 3,646,476 | A | 2/1972 | Barker et al. |
| 3,707,786 | A | 1/1973 | Clark |
| 3,745,439 | A | 7/1973 | Belmuth |
| 3,813,156 | A | 5/1974 | Davis |
| 3,822,930 | A | 7/1974 | Douklias |
| 4,006,970 | A | 2/1977 | Slater et al. |
| 4,217,040 | A | 8/1980 | Longerbeam |
| 4,403,964 | A | 9/1983 | Meier |
| 4,497,582 | A | 2/1985 | Lipman et al. |
| 4,579,534 | A | 4/1986 | Lipman et al. |
| 4,588,384 | A | 5/1986 | Shiba |
| 4,639,224 | A | 1/1987 | Maejima et al. |
| 4,776,666 | A | 10/1988 | Kuehn et al. |
| 4,779,176 | A | 10/1988 | Bornhorst |
| 4,972,305 | A | 11/1990 | Blackburn |
| 5,082,447 | A | 1/1992 | Hinkle |
| 5,090,789 | A | 2/1992 | Crabtree |
| 5,478,349 | A | 12/1995 | Nicholas |
| 5,649,827 | A | 7/1997 | Suzaki |
| 5,775,799 | A * | 7/1998 | Forkner ............. F21V 14/06 362/280 |
| 6,312,407 | B1 | 11/2001 | Zadno-Azizi et al. |
| 6,468,291 | B2 | 10/2002 | Bates et al. |
| 6,592,568 | B2 | 7/2003 | Campbell |
| 6,602,226 | B1 | 8/2003 | Smith et al. |
| 6,602,279 | B1 | 8/2003 | Nicholas |
| 6,623,126 | B2 | 9/2003 | Sekiguchi et al. |
| 6,698,900 | B1 | 3/2004 | Young et al. |
| 6,702,843 | B1 | 3/2004 | Brown et al. |
| 6,821,125 | B2 | 11/2004 | Sekiguchi et al. |
| 7,004,588 | B2 | 2/2006 | Sadler |
| 7,066,905 | B2 | 6/2006 | Squire et al. |
| 7,433,124 | B2 | 10/2008 | Kim et al. |
| 8,057,045 | B2 | 11/2011 | Johnson |
| 9,534,743 | B2 | 1/2017 | Allen et al. |
| 10,845,030 | B1 * | 11/2020 | Tornyai ............. F21V 7/041 |
| 2002/0024808 | A1 | 2/2002 | Suehiro et al. |
| 2002/0075460 | A1 | 6/2002 | Kappel et al. |
| 2003/0030777 | A1 | 2/2003 | Sekiguchi et al. |
| 2003/0179376 | A1 | 9/2003 | Houde-Walter et al. |
| 2004/0141237 | A1 | 7/2004 | Wohlstadter et al. |
| 2004/0233391 | A1 | 11/2004 | Kornev et al. |
| 2005/0195456 | A1 | 9/2005 | Houde-Walter et al. |
| 2006/0109553 | A1 | 5/2006 | Serafimovich et al. |
| 2006/0217794 | A1 | 9/2006 | Ruiz et al. |
| 2007/0032850 | A1 | 2/2007 | Ruiz et al. |
| 2009/0161074 | A1 | 6/2009 | Shinozaki et al. |

FOREIGN PATENT DOCUMENTS

| | | | |
|---|---|---|---|
| JP | 2003131560 | 5/2003 | |
| JP | 2003241303 | 8/2003 | |
| KR | 920002322 | 3/1992 | |
| KR | 970006884 | 7/1997 | |
| KR | 980060959 | 11/1998 | |
| WO | WO 2011/033437 | 3/2011 | |
| WO | WO-2011033437 A1 * | 3/2011 | ............. F21V 5/00 |

OTHER PUBLICATIONS

Complaint, *Shenzhen JingPinCheng Electronic Technology Co.* v. *Blisslights, LLC et al.*, Case No. 3 21-CV-0 1393 GPC-RBB, Doc:. 1 (S.D. Cal.). Aigust 3, 2021, 6 pages.

PCT International Search Report and Written Opinion in International Appln. No. PCT/US2021/059577, dated Feb. 9, 2022, 13 pages.

Roguin et al., "Continued expansion of the nitinol self-expanding coronary stent: angiographic analysis and 1-year clinical follow-up," American Heart Journal, Aug. 1, 1999, 138(2):326-33.

Walsh, "Tech Tips for Practicing Laserist: Diffraction Gratings: No. Show Should Go Without," The Laserist, Oct. 2005, 16(3), 3 pages.

* cited by examiner

OPTICAL PROJECTION DEVICE

CROSS-REFERENCE TO RELATED APPLICATIONS

This application claims the benefit of priority to U.S. Provisional Application Ser. No. 63/247,500, filed Sep. 23, 2021, the entire contents of which are hereby incorporated by reference.

TECHNICAL FIELD

This disclosure generally relates to an optical lighting device, which is also referred to herein as a projection device, optical device, lighting device, optical projection device, or simply a device or apparatus.

BACKGROUND

Noncoherent light sources (e.g., light emitting diodes (LEDs)) are employed in various lighting applications. However, noncoherent light sources (e.g., LEDs) emit light waves that (1) are out-of-phase and uncorrelated (unlike coherent light sources, such as lasers, that emit light waves that are in-phase and correlated with each other) and (2) do not create stationary interference (as is the case with lasers/coherent light sources). As a result, when a projection application includes LEDs of different colors, the light emitted from the LEDs mix together, resulting in a light of a whitish color rather than light that depicts the different individual colors. For at least this reason, most LED applications that use colored light, display a single color (i.e., such applications generally use one or more LEDs of the same color).

SUMMARY

The present disclosure generally relates to a projection device that can project multiple colors of noncoherent light in a patterned manner, that, e.g., can resemble a cloud-like effect. In some implementations, the projection device can also include a coherent light source (e.g., a laser) that can be used to generate a star-field effect, which can be layered on the cloud-like effect.

In general, one innovative aspect of the subject matter described in this specification can be embodied in a device (such as, e.g., a projection device) that includes a housing and a plurality of components included within the housing, the plurality of components including a plurality of light emitting diodes (LEDs), a parabolic mirror reflector, a sinusoidal lenticular diffuser, and a plurality of spatial filters. In some implementations, the plurality of LEDs are provided in at least two distinct colors; the parabolic mirror reflector is arranged to collimate light received from the plurality of LEDs; the sinusoidal lenticular diffuser is positioned at or near an output of the parabolic mirror reflector and is arranged to diffuse the collimated light received from the parabolic mirror reflector; and the plurality of spatial filters are arranged to diffuse the diffused and collimated light received from the sinusoidal lenticular diffuser, wherein each of the plurality of spatial filters has a first surface on which a plurality of relief structures are distributed; and an imaging lens coupled to the housing and arranged to magnify the diffused light received from the plurality of spatial filters and display a cloud-like effect on a first surface. Other implementations of this aspect include corresponding systems, apparatus, and devices. These and other implementations can each optionally include one or more of the following features.

In the some implementations, the projection device can include a planar diffuser that is positioned between the plurality of LEDs and the parabolic mirror reflector.

In some implementations, the planar diffuser can be arranged to diffuse light received from the plurality of noncoherent light sources and direct the diffused light toward the parabolic mirror reflector.

In some implementations, the plurality of LEDs can be arranged in an array, with each adjacent pair of LEDs being separated by an interstitial gap.

In some implementations, the interstitial gap can be 0.25 mm.

In some implementations, each spatial filter in the plurality of spatial filters comprises one of: a transmissive filter, a refractive filter, a reflective filter, or a diffractive filter.

In some implementations, the projection device can include a motor coupled to at least one spatial filter in the plurality of spatial filters and configured to move the at least one spatial filter, wherein moving the at least one spatial filter causes movement in the cloud-like effect displayed by the imaging lens.

In some implementations, the imaging lens can be a condenser lens.

In some implementations, the planar diffuser can be positioned at or near the focus or focal plane of the collimating optical element.

In some implementations, the plurality of LEDs are positioned at or near the focus or focal plane of the collimating optical element.

In some implementations, the sinusoidal lenticular diffuser can be one-dimensional or two-dimensional, and can be positioned at an output of the parabolic mirror reflector.

In some implementations, each of the plurality of spatial filters can have a first surface on which a plurality of relief structures are distributed, wherein the plurality of relief structures have varying sizes.

In some implementations, the projection device's housing can further include a first diffractive optical element and a coherent light source.

In some implementations, the motor is coupled to the first diffractive optical element and is configured to rotate the first diffractive optical element; and the at least one coherent light source is arranged to direct light from the at least one coherent light source through the first diffractive optical element, to generate a star-field effect for display on the first surface.

In some implementations, the projection device can include a second diffractive optical element. In such implementations, the first diffractive optical element can be a grating wheel; and the second diffractive optical element can be positioned between the at least one coherent light source and the grating wheel, wherein light output by the at least one coherent light source passes through the second diffractive optical element and the grating wheel.

Another innovative aspect of the subject matter described in this specification can be embodied in a device (such as, e.g., a projection device) that, a projection device can include a plurality of noncoherent light sources, wherein the plurality of noncoherent light sources are provided in at least two distinct colors; a collimating optical element that is arranged to collimate light received from the plurality of noncoherent light sources; a sinusoidal lenticular diffuser positioned at an output of the collimating optical element and arranged to diffuse the collimated light received from the collimating optical element; a spatial filter that is arranged to diffuse the diffused and collimated light received from the sinusoidal lenticular diffuser; and a lens that is arranged to magnify the diffused light received from the spatial filter and display the magnified light on a first surface. Other implementations of this aspect include corresponding systems, apparatus, and devices. These and other implementations can each optionally include one or more of the following features.

In some implementations, the projection device can include a second diffuser, wherein the second diffuser is positioned between the plurality of noncoherent light sources and the collimating optical element, and wherein the second diffuser is arranged to diffuse light from the plurality of noncoherent light sources and direct the diffused light toward the collimating optical element.

In some implementations, the sinusoidal lenticular diffuser can be one-dimensional or two-dimensional.

In some implementations, the plurality of noncoherent light sources are a plurality of light emitting diodes (LEDs).

In some implementations, the plurality of LEDs can be arranged in an array, with each adjacent pair of LEDs being separated by an interstitial gap.

In some implementations, the collimating optical element can be a parabolic mirror reflector or a refractive lens.

In some implementations, the spatial filter can include multiple spatial filters.

In some implementations, the spatial filter can include a transmissive filter, a refractive filter, a reflective filter, or a diffractive filter.

In some implementations, the projection device can include a motor coupled to the spatial filter and configured to move the spatial filter.

In some implementations, the projection device can include a gear assembly coupled to the motor to move the spatial filter.

In some implementations, the second diffuser can be a planar diffuser that can be positioned at or near the focus or focal plane of the collimating optical element.

In some implementations, the projection device can further include a first diffractive optical element and a coherent light source.

In some implementations, the motor is coupled to the first diffractive optical element and is configured to rotate the first diffractive optical element; and the at least one coherent light source is arranged to direct light from the at least one coherent light source through the first diffractive optical element, to generate a star-field effect for display on the first surface.

In some implementations, the projection device can include a second diffractive optical element. In such implementations, the first diffractive optical element can be a grating wheel; and the second diffractive optical element can be positioned between the at least one coherent light source and the grating wheel, wherein light output by the at least one coherent light source passes through the second diffractive optical element and the grating wheel.

It is appreciated that devices in accordance with the present disclosure can include any combination of the aspects and features described herein. That is, the devices in accordance with the present disclosure are not limited to the combinations of aspects and features specifically described herein, but also include any combination of the aspects and features provided.

The details of one or more implementations of the present disclosure are set forth in the accompanying drawings and the description below. Other features and advantages of the present disclosure will be apparent from the description and drawings, and from the claims.

BRIEF DESCRIPTION OF THE FIGURES

Like reference numbers and designations in the various drawings indicate like elements.

Figure 1:
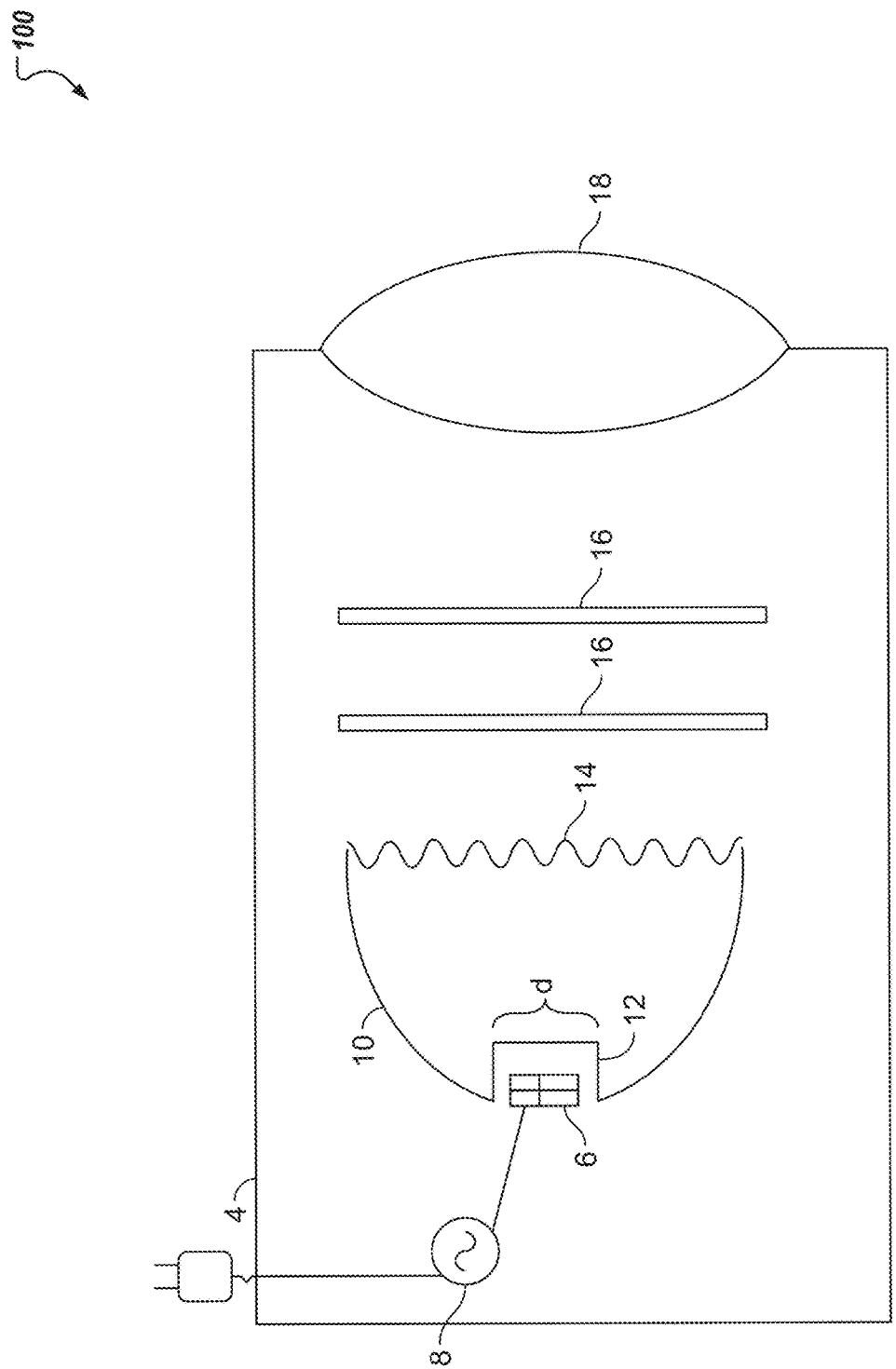
FIG. 1 shows a block diagram of an example projection device.

The patent or application file contains at least one drawing executed in color. Copies of this patent or patent application publication with color drawing(s) will be provided by the Office upon request and payment of the necessary fee.

DETAILED DESCRIPTION OF THE INVENTION

The present disclosure generally relates to a projection device that can project multiple colors of noncoherent light in a patterned manner, that, e.g., can resemble a cloud-like effect. In some implementations, the projection device described herein can also include a coherent light source (e.g., a laser) that can be used to generate a star-field effect, which can be layered on the cloud-like effect.

The projection device described herein can be used in various applications, including but not limited to architectural, entertainment, mood, and ambient lighting applications, and can utilize multiple noncoherent lights sources of different colors in a manner that permits light of multiple colors to be displayed to the viewer. In some implementations, and as described below, the projection device described herein produces or projects patterned structures of light onto a target surface (e.g., a wall, a projector screen, etc.).

As summarized here and described in greater detail with reference to FIGS. 1-14 below, a projection device can include multiple components, including multiple noncoherent light sources, a power supply, a collimating optical element, one or more diffusers, one or more spatial filters, and an imaging lens. In some implementations, when a power source/supply provides power to noncoherent light sources (e.g., LEDs of different colors), the noncoherent light sources emit light (e.g., light of different colors/ wavelengths). A diffuser (e.g., a planar diffuser) can be positioned adjacent to the noncoherent light sources. The diffuser diffuses the light emitted from the noncoherent light sources. The diffused light from the planar diffuser can be collimated by a collimating optical element (e.g., a parabolic mirror reflector or a refractive lens). The collimated light can then be diffused by another diffuser (e.g., a sinusoidal lenticular diffuser, which can be single- or multi-dimensional).

The collimated and diffused light from the collimating optical element flows toward one or more spatial filters (e.g., transmissive, refractive, reflective, or diffractive filters), which further diffuse the collimated and diffused light. The light output through the one or more spatial filters flows toward an imaging lens that focuses and displays the light on a target surface (e.g., a wall or a projector screen).

In some implementations, the one or more spatial filters can be rotated, translated, oscillated, or otherwise moved. In such implementations, the projection device can include a motor (powered, e.g., by the same power supply that also powers the noncoherent light sources) that rotates, translates, oscillates, or otherwise moves the one or more spatial filters. In some implementations, the motor can directly move the one or more spatial filters or can indirectly move them by means of a gear assembly.

In some implementations, the diffuser (e.g., the planar diffuser), which is generally positioned between the collimating optical element and the noncoherent light sources, can be placed at or near the focus or focal plane of the collimating optical element. In some implementations, the angular illumination of the projection device can be determined based on the surface diameter of this diffuser.

In some implementations, the projection device can be implemented without the diffuser (e.g., planar diffuser) positioned between the collimating optical element and the noncoherent light sources. In such implementations, no additional optical elements may be placed between the noncoherent light sources and the collimating optical element. Alternatively, and instead of the planar diffuser, another optical element (e.g., a clear lens) can be placed between the noncoherent light sources and the collimating optical element.

In some implementations, the multiple noncoherent light sources can include light sources that emit light of different colors (e.g., light of different wavelengths). For example, the multiple noncoherent light sources can include two noncoherent light sources that each emit red light and two additional noncoherent light sources that each emit green light. One skilled in the art will appreciate that various combinations of noncoherent light sources can be implemented that collectively emit noncoherent light of different colors.

These and additional features of projection devices are described below with reference to FIGS. 1-14.

FIG. 1 depicts a block diagram of an example projection device 100.

As depicted in FIG. 1, the projection device 100 includes a housing 4 within which multiple components are included. These components include: multiple noncoherent light sources 6, a power supply 8, a collimating optical element 10, a diffuser 12, a diffuser 14, and spatial filters 16. An imaging lens 18 is positioned after the spatial filters 16 and is coupled to the housing 4. The structure and operations of these components are further described below.

As shown in FIG. 1, the power supply 8 can provide power to, e.g., multiple noncoherent light sources 6 and a motor (if provided; not shown in FIG. 1). The power supply 8 can be any suitable power supply, e.g., D/C (direct current), A/C (alternating current), RF (radio frequency), etc. One skilled in the art will appreciate that, for implementations with an A/C power supply, the projection device 100 can further include a rectifier circuit (not shown) that rectifies an alternating current input to generate a direct current output, which in turn is used to power, e.g., the multiple noncoherent light sources 6.

As shown in FIG. 1 (and as further described with reference to FIGS. 2A-2B), the multiple noncoherent light sources 6 are arranged as an array of four noncoherent light sources (e.g., four LEDs). At least two of these noncoherent light sources emit light having different colors (and thus, different wavelengths). For example, the four LEDs can be made up of one red LED (i.e., an LED that emits red light), one blue LED (i.e., an LED that emits blue light), and two green LEDs (i.e., LEDs that each emit green light). As another example, a first LED can be red, a second LED can be green, a third LED can be blue, and a fourth LED can be white. One skilled in the art will appreciate that multiple combinations of LEDs (or other noncoherent light sources) of different colors can be made.

Moreover, although the projection device 100 is shown in FIG. 1 as having an array of four noncoherent light sources, one skilled in the art will appreciate that the projection device 100 can have any N number of noncoherent light sources (where N is greater than or equal to two) and the N noncoherent light sources can be in any arrangement (e.g., they can, but need not be arranged, as an array). One example implementation of an array of noncoherent lights sources is depicted in and described with reference to FIGS. 2A-2B.

In some implementations, the noncoherent light sources 6 can be enclosed within a transparent protective cover (not shown in FIG. 1), which can be of any appropriate shape, that protects the noncoherent light sources 6. Example shapes of the transparent protective cover include, e.g., a hemisphere, a hemicylinder, a cone, or a flat top. One skilled in the art will appreciate that the protective cover does not occlude or otherwise interfere with the light emitted from the noncoherent light sources 6. For example, the transparent protective cover can be thin and uniform to reduce any optical effects on the light resulting from the transparent cover itself.

As shown in FIG. 1, the multiple noncoherent light sources 6 are positioned adjacent to a planar diffuser 12 and a collimating optical element 10. Although projection device 100 can also be implemented without the planar diffuser 12 between the multiple noncoherent light sources 6 and the collimating optical element 10, for purposes of the below disclosures, the projection device 100 is described as including the planar diffuser 12.

Figure 2A:
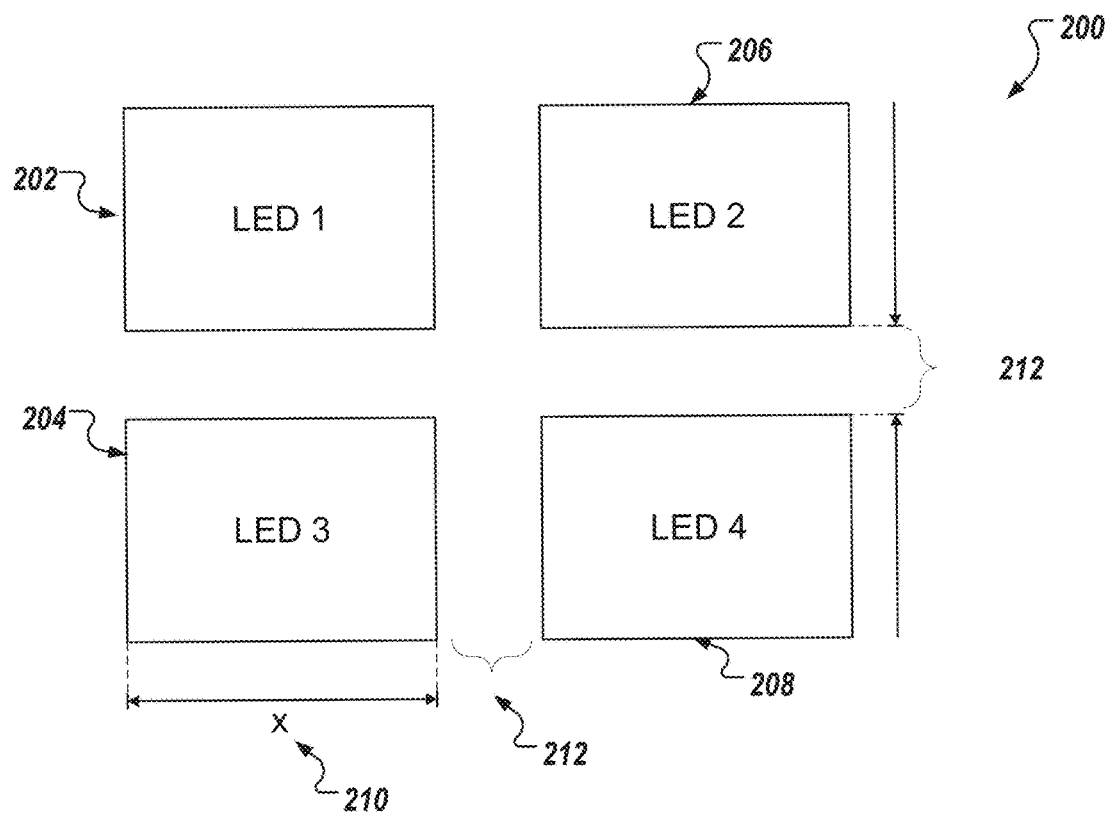
FIG. 2A shows an example arrangement of the multiple noncoherent light sources of a projection device.
Figure 2B:
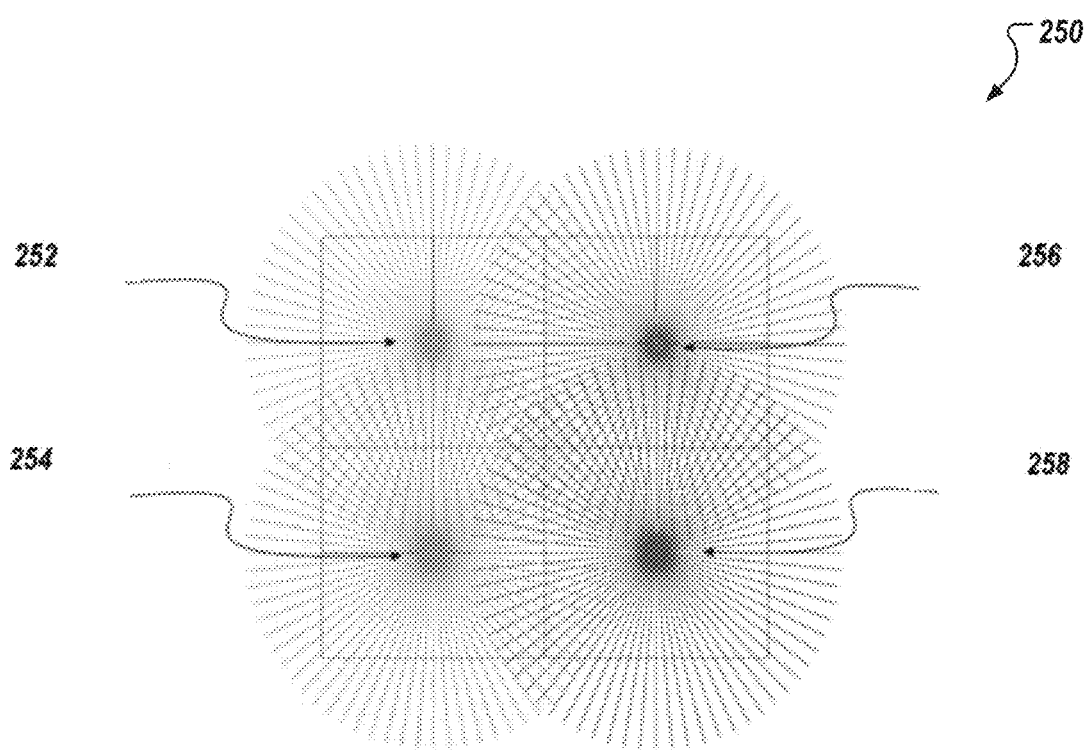
FIG. 2B shows an example LED array depicting light emitted by each LED.

In some implementations, the multiple noncoherent light sources 6 are positioned at or near the focal plane or focal point of the collimating optical element. For example, the noncoherent light sources 6 (e.g., a 2×2 array of LEDs, as shown in FIGS. 2A and 2B) can be placed at or near the focus of the collimating optical element 10 (e.g., a parabolic mirror reflector). Such positioning of the noncoherent light sources relative to the collimating optical element has the advantage of optimal light collection, less off-axis error, and even distribution of the light from the multiple noncoherent light sources 6.

In some implementations, the noncoherent light sources 6 can be positioned at a point before or after the focal point or focal plane of the collimating optical element. In such implementations, the light output by the noncoherent light sources 6 demonstrates a change in apparent color homogeneity relative to the light output by the noncoherent light sources 6 when they are positioned at the focal point or focal plane of the collimating optical element 10.

The planar diffuser 12 diffuses the light waves emitted from the multiple noncoherent light sources 6, spreading the light waves across a wider target point and gathering the light into a concentrated location from which, e.g., a second diffusor (e.g., the lenticular diffuser 14, described below) can further diffuse the light.

The collimating optical element 10 collimates light waves that are produced/emitted by the multiple noncoherent light sources 6 and diffused by the planar diffuser 12, e.g., by orienting the light waves in a substantially parallel arrangement. In some implementations, the collimating optical element 10 can be a diffuse reflector (e.g., a parabolic mirror reflector) or a refractive lens system. In comparison to a parabolic mirror reflector, a refractive lens system redirects and collimates less light. This is because, unlike the refractive lens, the parabolic mirror reflector can substantially surround the noncoherent light sources to collimate a significant amount of the light emitted by the multiple noncoherent light sources 6. For illustration, the collimating optical element 10 of FIG. 1 is a parabolic mirror reflector.

The planar diffuser 12 has a length or diameter d and, in some implementations, can be placed at or near the focus or focal plane of the collimating optical element 10. One skilled in the art will appreciate that, in some implementations, the planar diffuser 12 need not be positioned at or near the collimating optical element 10's focus/focal plane.

In implementations where the collimating optical element 10 is a diffuse reflector (e.g., a parabolic mirror reflector as shown in FIG. 1), the planar diffuser 12 can be placed at or near the focal plane of the diffuse reflector. In such implementations, the planar diffuser 12 can also direct some of the light waves onto the surface of the parabolic mirror reflector to collimate that light.

And, in implementations where the collimating optical element 10 is refractive lens, the planar diffuser 12 can be placed at or near the focal point of the refractive lens. In some implementations, the angular illumination of the projection device 100 can be determined based on the surface diameter of the planar diffuser 12.

Figure 8:
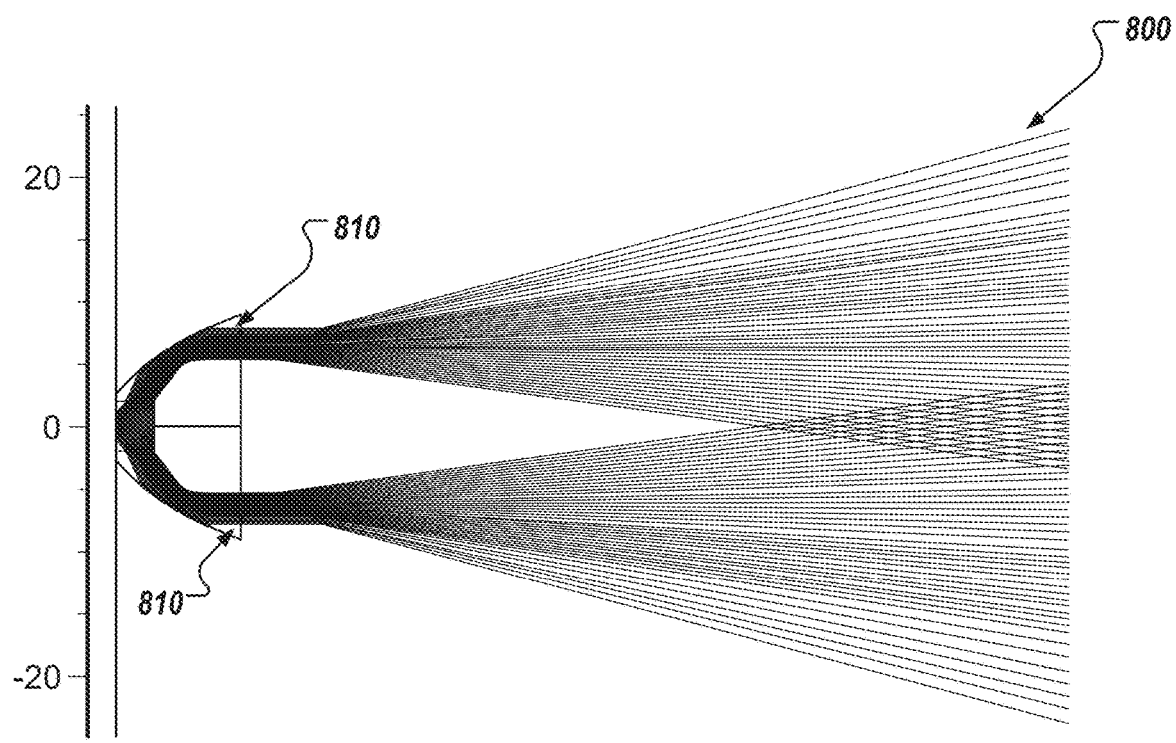
FIG. 8 shows an optical model showing the pathway of light as it flows through a projection device.
Figure 9:
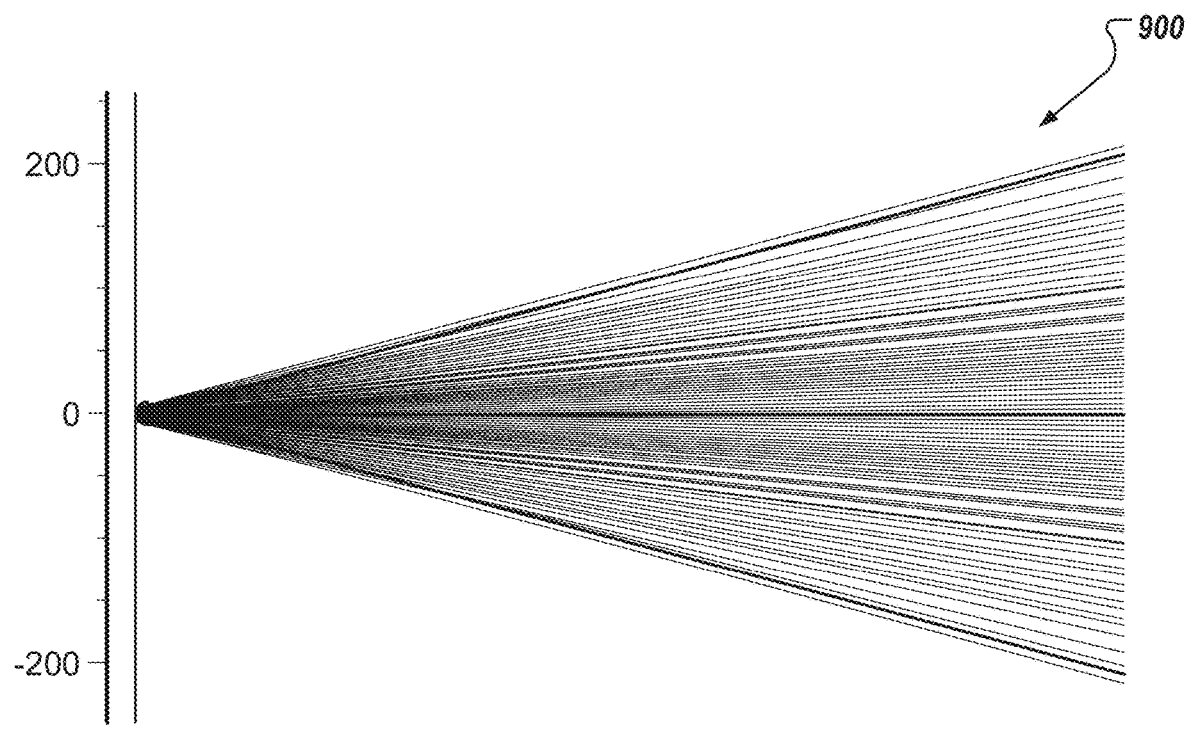
FIG. 9 shows a zoomed-out version of the optical model shown in FIG. 8.

While any particular angle of diffusion can be selected for the projection device 100, an angular range of −15 degrees to 15 degrees (i.e., where the angle of diffusion for the diffused light from the collimator is 15 degrees above the normal plane and 15 degrees below the normal place) produces a light projection result that maximizes the final size of the light projection without wasting extra scattered light that do not make it through the optical components of the projection device 100. FIGS. 8 and 9 show a pathway of light produced by the example projection device 100 of FIG. 1, where the angular range of diffusion is 15 degrees.

In implementations where the collimating optical element 10 is a parabolic mirror reflector, a designer of the projection device 100 can determine an inner parabolic surface of the parabolic mirror reflector based on the angular range of diffusion, the dimensions of the multiple noncoherent light sources 6, the focal length of the parabolic reflector, and the output diameter of the parabolic mirror reflector. For example, in a projection device 100 having an angular range of diffusion −15 degrees to 15 degrees, a 2.65 mm by 2.65 mm array of LEDs, a focal length of the parabolic reflector of 1.875 mm, and an output diameter of the parabolic reflector of 18 mm, the inner parabolic surface can be determined by the following equation:

$$y=(2/15)x^2 \tag{equation 1}$$

In the above equation, (1) 2/15 (or 0.13333) represents a shape measurement of a parabolic mirror reflector cross section, (2) y is the inner parabolic surface measurement (or in other words, the height of the parabolic curve above the x-axis), and (3) x represents the radial position of a radially symmetric parabolic reflector. One skilled in the art will understand that the value 2/15 (or 0.13333) would vary for different parabolic mirror reflectors, which may have different measured cross sections.

Moreover, as illustrated in FIGS. 8 and 9, the light source dimensions (2.65 mm×2.65 mm) as well as their location relative to the parabolic mirror reflector (e.g., at the focal point of the parabolic mirror reflector) is related to the parabolic mirror reflector's shape, and contributes to/enables the +/−15-degree angle of diffusion after leaving the parabolic mirror reflector.

Returning to FIG. 1, projection device 100 further includes a diffuser 14 (e.g., a lenticular diffuser) that can be placed at the collimating optical element 10's output, as shown in FIG. 1. One skilled in the art will understand that the collimating optical element 10's output refers to the point where the light emerging from the collimating optical element 10 becomes oriented in substantially parallel path (this point is also referred to as the emergent point and is generally depicted as 810 in FIG. 8, which is at the peripheral ends of the collimating optical element).

Positioning the lenticular diffuser 14 at the output of the collimating optical element 10 has the advantage of providing a large amount of light output by the collimator optical element 10 to the lenticular diffuser 14. In contrast, when the lenticular diffuser 14 is positioned beyond the collimating optical element 10's output (i.e., beyond the output of the collimating optical element and closer to the spatial filters 16) of the collimating optical element 10, the light output from the collimating optical element 10 begins to diverge. In such a scenario where the diffuser 14 is spaced further past the output of the collimating optical element 10, a lesser amount of light from the collimating optical element 10 is provided to the lenticular diffuser 14. Additionally, positioning the lenticular diffuser 14 at the output of the collimating optical element 10 enables manufacturing a single combined collimating/lenticular optical element, which reduces cost of manufacturing the projection device's optical elements.

In some implementations, the lenticular diffuser 14 can be a one-dimensional diffuser that diffuses or spreads light in a single dimension. In some implementations, the diffuser 14 can be a two-dimensional diffuser that diffuses or spreads light in two dimensions.

Figure 12A:
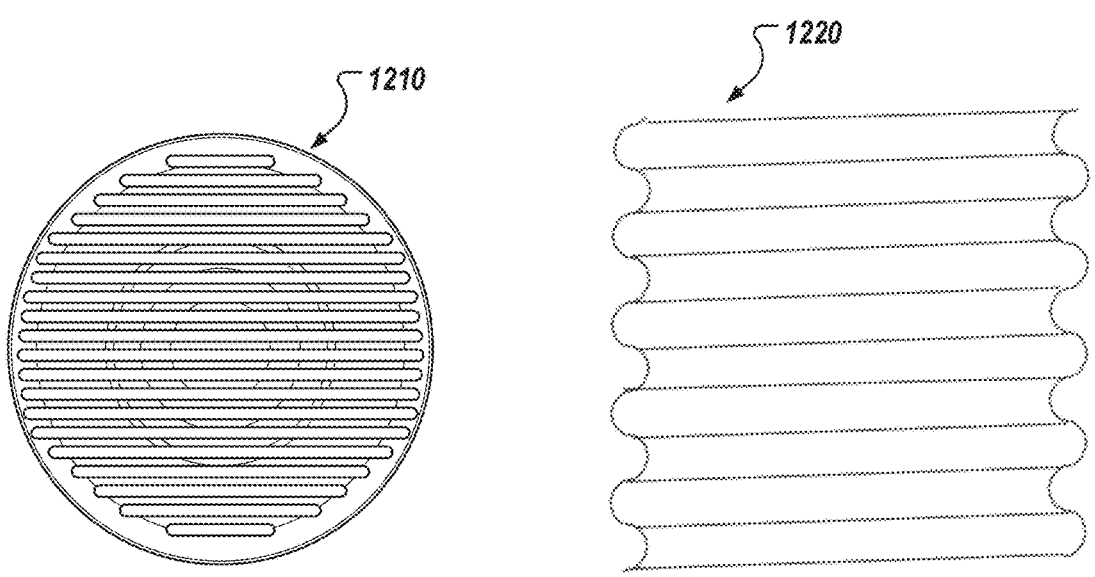
FIG. 12A shows an example one-dimensional sinusoidal lenticular diffuser lens.
Figure 12B:
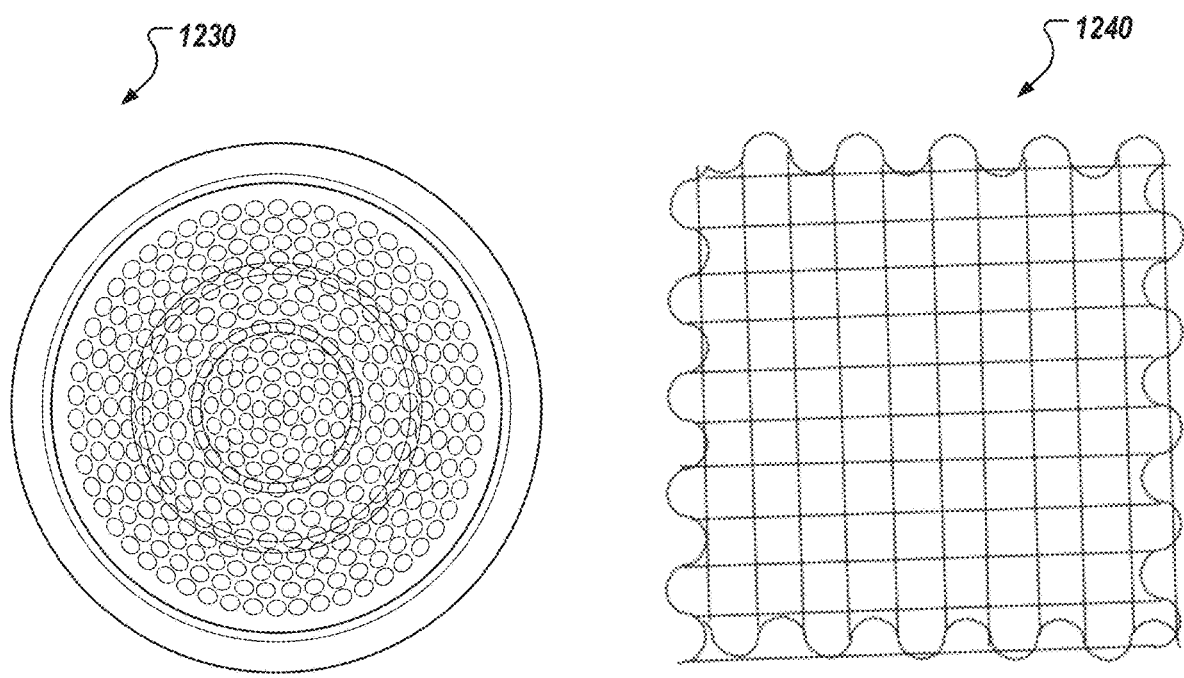
FIG. 12B depicts an example two-dimensional sinusoidal lenticular diffuser lens.

In some implementations, the one-dimensional diffuser can be a sinusoidal lenticular diffusor lens (as depicted in FIG. 1). The sinusoidal lenticular diffuser can have a pitch of, e.g., 1.0/mm. FIG. 12A depicts an example one-dimensional sinusoidal lenticular diffuser lens 1210, with an example one-dimensional sinusoidal pattern for the sinusoidal lenticular diffuser lens 1210 being depicted in image 1220. FIG. 12B depicts an example two-dimensional sinusoidal lenticular diffuser lens 1230, with an example two-dimensional sinusoidal pattern for the sinusoidal lenticular diffuser lens 1230 being depicted in image 1240. The projection results for a projection device (e.g., projection device 100) that uses a one-dimensional sinusoidal lenticular diffuser and a projection device (e.g., projection device 100) that uses a two-dimensional sinusoidal lenticular diffuser are shown and described with reference to FIGS. 3 and 4, respectively.

Figure 3:
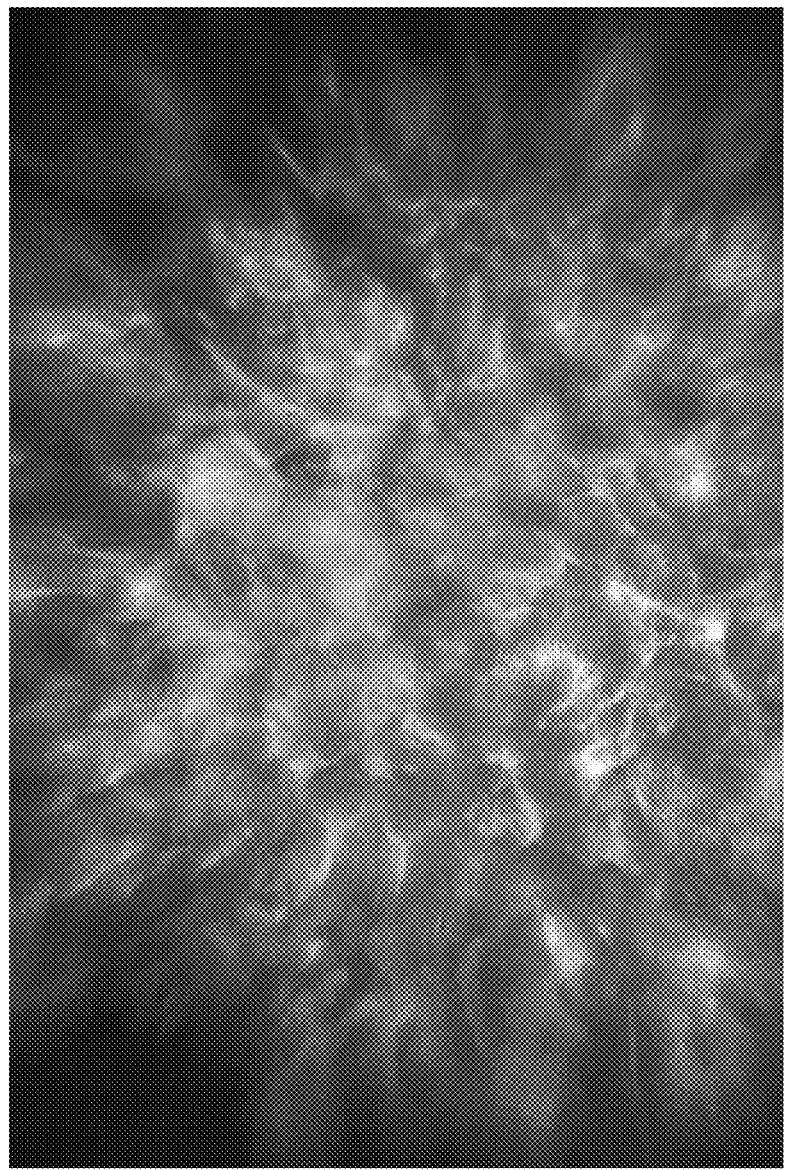
FIG. 3 shows a projection image resulting when a projection device includes a one-dimensional, sinusoidal lenticular diffuser.
Figure 4:
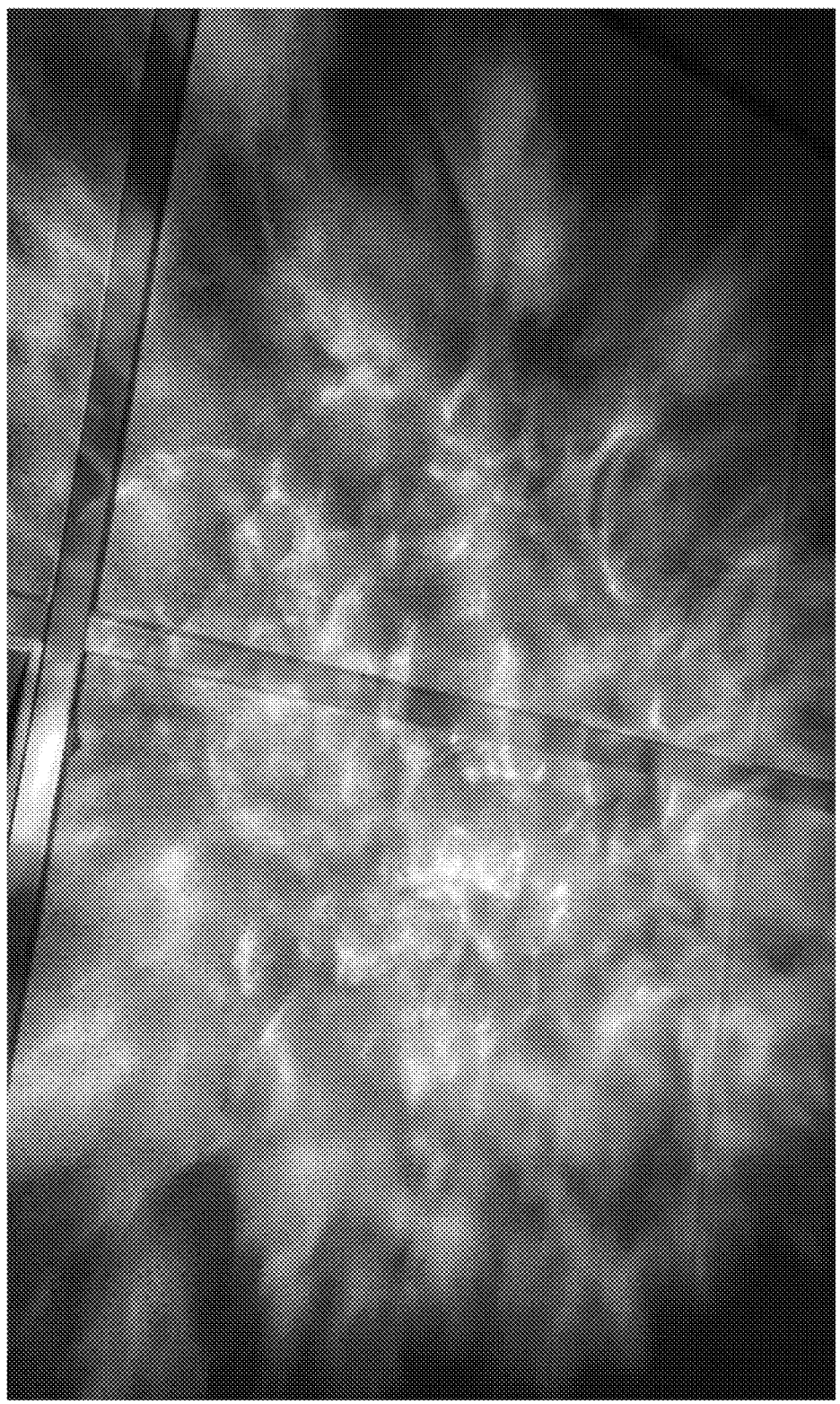
FIG. 4 shows a projection image resulting when a projection device includes a two-dimensional, sinusoidal lenticular diffuser.

FIG. 3 depicts an image 300 showing the projection result when a projection device (e.g., projection device 100) includes a one-dimensional, sinusoidal lenticular diffuser, while FIG. 4 depicts an image 400 showing the projection result when a projection device (e.g., projection device 100) includes a two-dimensional, sinusoidal lenticular diffuser. When a two-dimensional diffuser is used in a projection device (e.g., in projection device 100)—such as e.g., the diffuser lens 1230 in FIG. 12B—the resulting light beam blends the different light colors together and results in a hazy appearance, as shown in FIG. 4. In contrast, when a one-dimensional diffuser is used in a projection device (e.g., in projection device 100)—such as e.g., the diffuser lens 1210 in FIG. 12A—the resulting light beam, as depicted in FIG. 3, has a fuller, clearer color display (compared to the hazy appearance resulting from two-dimensional diffuser).

Additionally, when compared to a two-dimensional sinusoidal lenticular diffuser, the one-dimensional sinusoidal lenticular diffuser produces more separation of the multiple colors used in the array of noncoherent light sources 6, which in turn generates a more variable imaging effect (relative to a two-dimensional diffuser). The one-dimensional sinusoidal lenticular diffuser can partially mix the colors of light emanating from the noncoherent light sources 6 (as shown in FIG. 3), without making the resulting light have a hazy appearance (as is the case in the image shown in FIG. 4). Although FIG. 1 shows a sinusoidal lenticular diffuser (diffuser 14), the diffuser 14 need not be sinusoidal (e.g., it can be a non-sinusoidal diffuser as well).

Figure 5A:
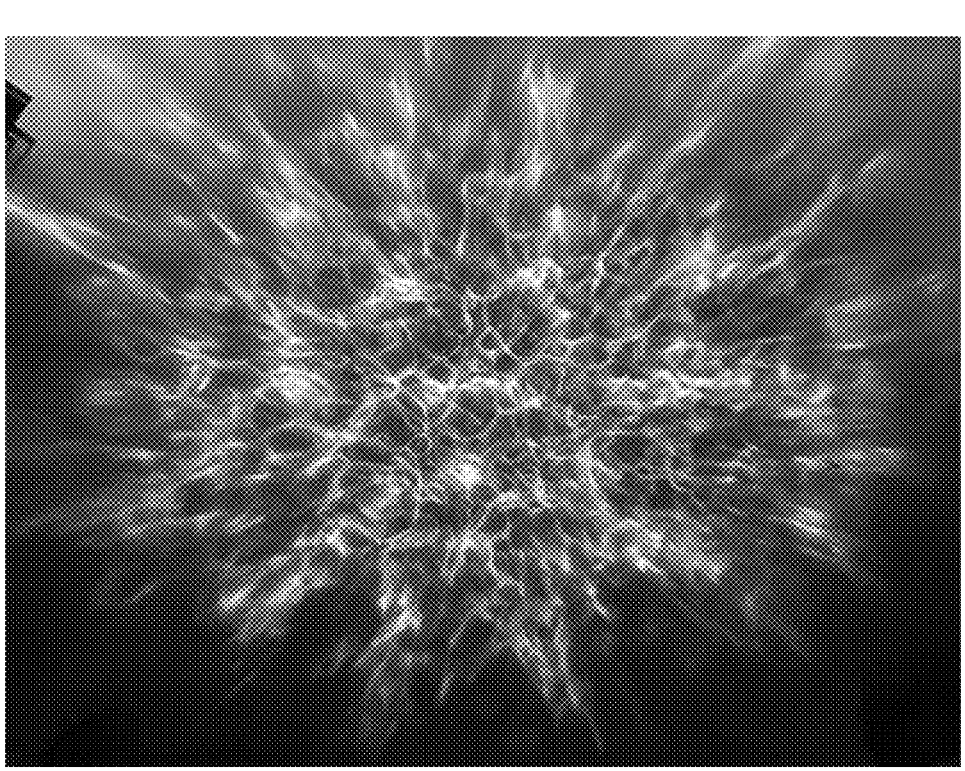
FIGS. 5A and 5B show projection images resulting when a projection device does not include a lenticular diffuser.
Figure 5B:

In some implementations, the projection device 100 can be implemented without the diffuser 14 (e.g., the lenticular diffuser). In such implementations, without the use of the second diffuser 14, the resulting light projected from the projection device has the appearance of a cobweb, with large patches of darkness visible between the thin strands of light. This is depicted in FIGS. 5A and 5B. FIG. 5A depicts an image 500, which shows the projection result when the projection device (e.g., projection device 100) does not include the lenticular diffuser 14 and the noncoherent light sources only emit white light. FIG. 5B depicts an image 550, which shows the projection result when the projection device (e.g., projection device 100) does not include the lenticular diffuser 14 and the noncoherent light sources collectively emit blue, red, and green light. As depicted in both images 500 and 550, the resulting light projected from the projection device has the appearance of a cobweb, with large patches of darkness visible between the thin strands of light.

Returning to FIG. 1, after the collimated light output from the collimating optical element 10 is diffused by the diffuser 14 (e.g., the sinusoidal lenticular diffuser), the collimated and diffused light passes through one or more spatial filters 16. Each spatial filter 16 further diffuses the light, with the effect of magnifying the projection area that would otherwise be provided without utilizing a spatial filter 16. Although FIG. 1 depicts the projection device 100 as having two spatial filters 16, the projection device 100 can include one spatial filter 16 or more than two spatial filters 16.

In implementations where the projection device has a cascade/series of spatial filters 16 of the same construction (as in the case of the two spatial filters 16 shown in FIG. 1), there can be a doubling of the diffusion angle resulting from the previous filter. As one example, if one spatial filter generates an angle of diffusion equal to +/−5 degrees, then two identical spatial filters expand the angular diffusion by a factor of two, resulting in the angle of diffusion of +/−10 degrees. In this example, if the light leaving the parabolic mirror reflector has an approximate angular diffusion of +/−15 degrees, then the overall angular diffusion of the light (i.e., the light coming from the parabolic mirror reflector and after it passes through the two identical spatial filters) is +/−25 degrees (i.e., 15+5+5). As another example, if one spatial filter generates an angle of diffusion equal to +/−7.5 degrees, then two identical spatial filters expand the angular diffusion by a factor of two, resulting in the angle of diffusion of +/−15 degrees. In this example, if the light leaving the parabolic mirror reflector has an approximate angular diffusion of +/−15 degrees, then the overall angular diffusion of the light (i.e., the light coming from the parabolic mirror reflector and after it passes through the two identical spatial filters) is +/−30 degrees (i.e., 15+7.5+7.5). In this example, the pair of spatial filters 16 magnifies the diffusion angle to, e.g., 30 degrees to the normal, thus doubling the angular diffusion relative to the angular diffusion (+/−15 degrees) of the light output from the parabolic mirror reflector.

Figure 10:
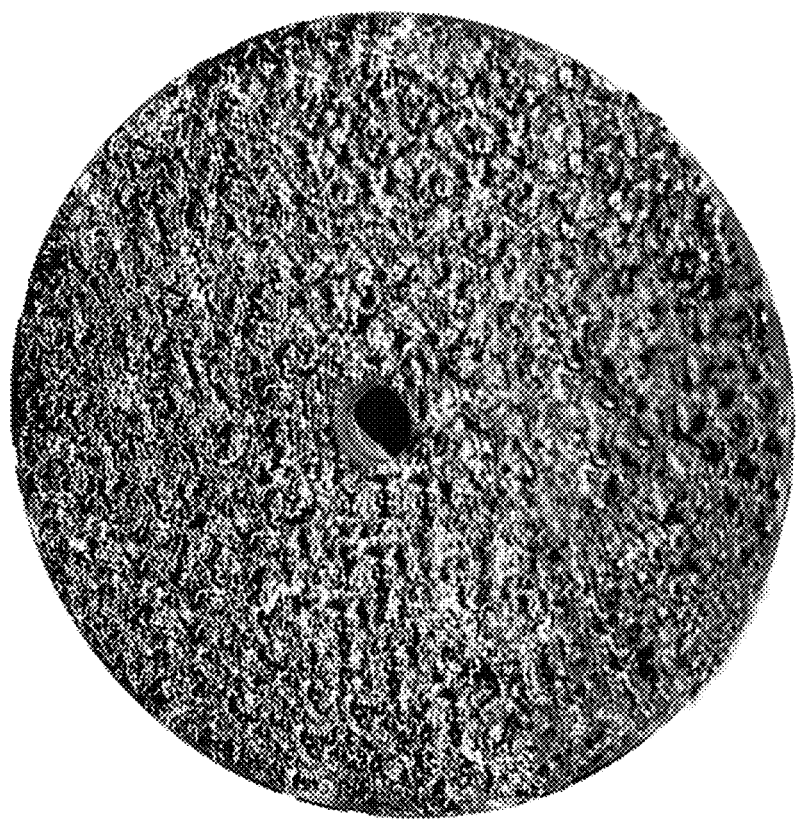
FIG. 10 shows an example image of a rotational spatial filter.

In some implementations, a spatial filter 16 can also add additional optical effects, e.g., the filters may be transmissive, reflective, diffractive, or refractive filters. FIG. 10 shows an example image 1000 of a rotational spatial filter. As described with reference to FIG. 13, a motor (and a gear assembly) can be coupled to the rotational spatial filter (e.g., via the circular aperture defined at the center of the rotational spatial filter) and can be configured to rotate the rotational spatial filter.

In some implementations, a spatial filter 16 can have quasi-random reliefs (also referred to herein as relief structures or relief patterns) defined on its surface. For example, FIG. 10 shows the surface topology of the rotational spatial filter including a plurality of reliefs distributed throughout the surface of the rotational spatial filter. Examples of the relief structures provided on the surface of the spatial filters 16 are further described with reference to and depicted in FIG. 11A and FIG. 11B.

The relief structures on the surface of the spatial filters 16 can create a non-uniform scattering of light into the object plane of the imaging lens 18, to be imaged outward by the imaging lens 18 onto the final projection surface (also referred to herein as the target surface). The relief patterns/structures can randomly concentrate the collected light into a landscape of intensity patterns that are distinctive in appearance. This distinctive landscape of light based on the relief patterns has the appearance of clouds. And, when the projection device 100 includes a motor for moving the spatial filter(s) 16, this distinctive landscape of light based on the relief patterns has the appearance of moving clouds.

In some implementations, the one or more spatial filters 16 can be stationary or they can be moving (e.g., rotating or translating in oscillation (i.e., moving back and forth)). In implementations where the projection device includes two or more spatial filters, the spatial filters 16 can be moved (e.g., rotated or translated) in the same direction or in opposite directions, and can be moved at the same or different speeds. The movement of the spatial filters 16 results in the movement of the projected image output by the projection device 100. In some implementations, one spatial filter can be rotated or moved, while one or more other spatial filters can be maintained as stationary.

When the projection device 100 includes one or more spatial filters 16 that are to be rotated, translated, or otherwise moved, the projection device 100 can include a motor. The motor can be directly or indirectly (e.g., by a gear assembly) coupled to the one or more spatial filters 16, to rotate, translate, or otherwise move them. This is further described and depicted with reference to FIG. 13.

Returning to FIG. 1, after light has been diffused by the one or more spatial filters 16, the diffused light passes through lens 18 (as shown in FIG. 1) that directs the light onto a target surface. In some implementations, lens 18 can operate as both a condenser lens and an imaging lens. In such implementations, lens 18 operates as (1) a condenser lens because it collects and transmits (i.e., condenses) the incoming light and (2) an imaging lens because it projects a focused image of, e.g., the intensity landscape previously generated by the spatial filters 16 (described above).

Figure 6:
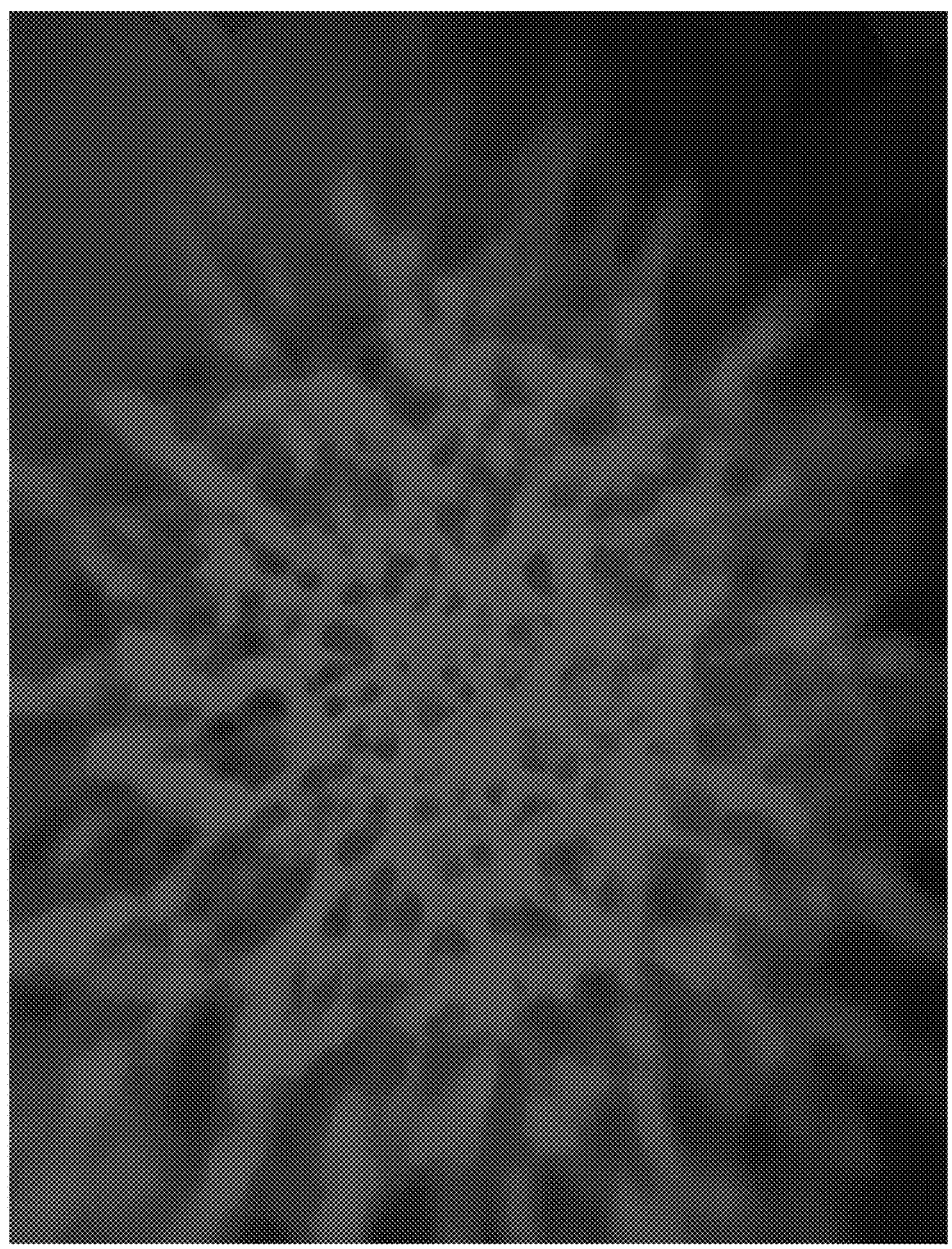
FIG. 6 shows a single-color image resulting from light passing through an imaging lens of a projection device.
Figure 7:
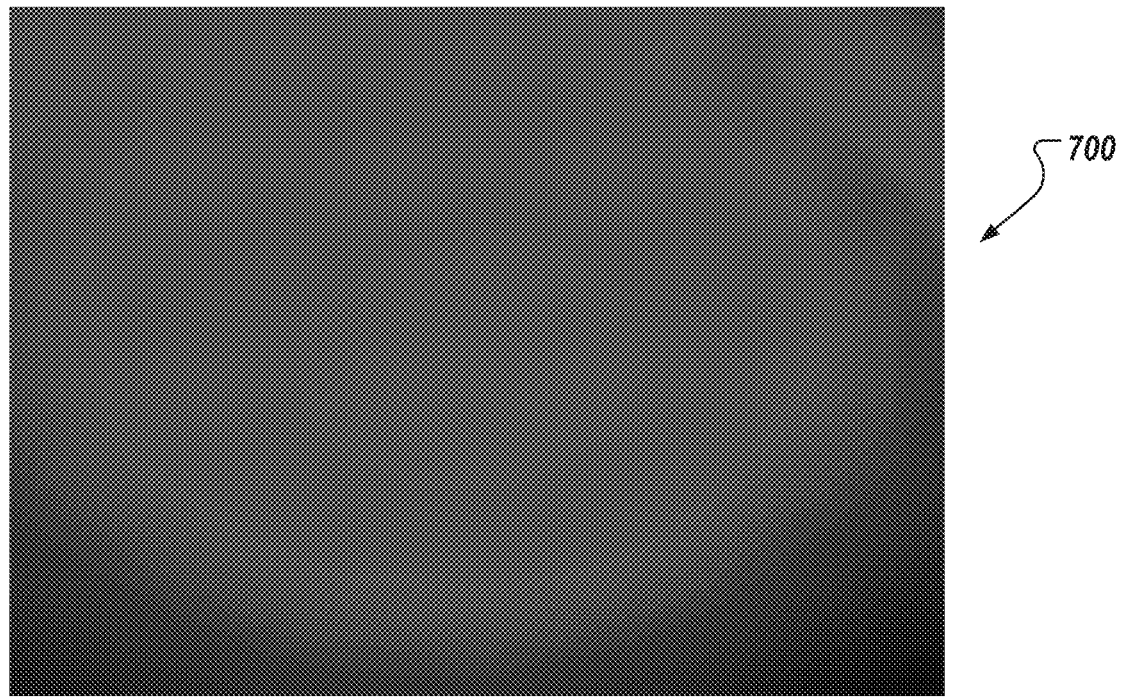
FIG. 7 shows a single-color image resulting from light passing through a projection device that does not include an imaging lens.

FIG. 6 shows a single-color image 600 that results upon light passing through the imaging lens (e.g., lens 18) of a projection device (e.g., projection device 100), while FIG. 7 shows the same light projection for a single-color image 700 but without the imaging lens (i.e., a projection device 100 that does not include such a lens). As discerned from comparing these two images, when the projection device 100 does not include the imaging lens 18, the resulting projection (as shown in FIG. 7) does not reflect the various patterns of light that are discernible in the projection result obtained from the projection device 100 including the imaging lens (as shown in FIG. 6).

In some implementations, lens 18 can be, e.g., an aspherical or spherical refractive lens.

The lens 18 does not alter the area of illumination; instead, it can magnify the light structures within the image to make them more visible to the eye. The magnification of the lens 18 is determined based on the distance between the last spatial filter 16 and the lens 18. As described herein, the last spatial filter refers to the spatial filter that is adjacent to the lens 18, with no intervening spatial filters therebetween.

The magnification of the lens 18, which is based on the distance between the last spatial filter 16 and the lens 18, is represented using the following equation:

$$m = d_b/d_a \quad \text{(Equation 2)}$$

where, m is the magnification of the lens 18, $d_b$ is the target distance (representing the distance from the lens 18 to the target surface), and $d_a$ is the distance from the lens 18 to the surface of the last spatial filter 16.

For example, when the projection device 100 is intended for use in an indoor room, the target surface can be designed to be approximately 2 meters away from the imaging lens. In this example, if the lens 18 is about 2 cm (0.02 m) from the last spatial filter 16 ($d_a$), a magnification (m) of 100× (2/0.02=100) would provide the appropriate target distance ($d_b$) of 2 meters.

One skilled in the art will appreciate that the intended target distance ($d_b$), the lens distance from the last spatial filter ($d_a$), and the amount of magnification (m) are all variables that a designer of the projection device can modify based on the intended application of the projection device (e.g., indoors, outdoors, the size of intended light projection, or the distance of the required projection. For example, if the projection device (e.g., projection device 100) is intended to be used outdoors, a designer of projection device 100 can select a target distance ($d_b$) greater than 2 meters (e.g., 5 meters), in which case, the 2 cm distance from the lens 18 to the surface of the last spatial filter 16 ($d_a$) results in a magnification of 250× (5/0.02).

FIGS. 8 and 9 show the pathway of light resulting from the collimating optical element 10 of the projection device 100 of FIG. 1, where the angular range of diffusion is 15 degrees (i.e., 15 degrees above and below the normal/center line). In particular, FIG. 8 depicts an optical model showing the pathway of light as it flows from the collimating optical element outwards. And, FIG. 9 depicts the same optical model that has been zoomed out to show the light path within a 15-degree wedge. As shown in FIG. 9, the light from the noncoherent light sources is diffused within the 15-degree wedge, with minimal light escaping outside that wedge. For context and clarity, the optical models shown in FIGS. 8 and 9 are based on devices that do not include any of the elements of the projection device 100 after the collimating optical element 10. One skilled in the art will appreciate—in view of the above descriptions—that the angular diffusion of the light from the collimated optical element is magnified when interacting with one or more spatial filters 16.

FIG. 2A depicts one example arrangement of the multiple noncoherent light sources 6 included in the projection device 100. As shown in FIG. 2A, the multiple noncoherent lights sources 6 include four (4) LEDs (LED 1 202, LED 2 206, LED 3 204, and LED 4 208) that are arranged in a two-by-two grid or square.

In some implementations, and as depicted in FIG. 2A, each LED in an adjacent pair (e.g., LED 1 and LED 2, LED 3 and LED 4, LED 1 and LED 3, LED 2 and LED 4) of LEDs is spaced apart from the other LED in the pair and is preferably spaced wide enough apart to prevent the LEDs from overheating. For example, the adjacent LED pair of LED 1 and LED 2 are separated by a space. As another example, the adjacent LED pair of LED 1 and LED 3 are separated by a space.

The space between each adjacent pair of LEDs defines an interstitial gap 212. In some implementations, the interstitial gap 212 can be approximately 15-30% of the width (x; 210) of an individual LED, which has been found to provide sufficient spacing to prevent overheating. For example, if the LEDs used in the projection device measure 1.2 mm along each edge (such that the width x=1.2 mm), the interstitial gap 212 can be 0.25 mm, which is approximately 20% of the width of the LED.

FIG. 2B shows an example LED array 250 depicting light emitted by each LED in the array. The LED array 250 is one example arrangement of the multiple noncoherent light sources 6, which are depicted in FIG. 1 and further illustrated in FIG. 2A. Although there is no spacing between each adjacent pair of LEDs in the LED array 250, one skilled in the art will appreciate that some spacing (as shown and depicted in FIG. 2A) could be provided between each adjacent LED pair (and doing so could reduce overheating by the LEDs in the LED array 250).

The LED array 250 includes four differently-colored LEDs: a cyan LED 252, a red LED 256, a green LED 254, and a blue LED 258. One skilled in the art will appreciate that any combination of LED colors could be provided in the LED array 250.

As shown in FIG. 2A, each LED radiates/emits light in a pattern (e.g., a roughly spherical pattern) and the radiation patterns of the LEDs at least partially overlap, resulting in a range/distribution of wavelengths (and by extension, a distribution of individual/discrete colors and overlapping colors) being radiated from the LED array 250. And, as explained with reference to FIG. 1, this distribution of light radiated by the LED array 250 is directed toward the lenticular diffuser (which, e.g., can be positioned at or near the output of the collimating optical element), which further mixes and blends the received distribution of light of individual and overlapping colors.

There is a direct relationship between the spacing of the LEDs in the LED array and the color mixing/integration of the light output by the lenticular diffuser. In particular, when the LEDs in the LED are spaced closer together, the light output by the LEDs interact with the lenticular diffuser and undergo more color mixing/integration relative to an arrangement where LEDs are spaced further apart from each other in the LED array (in which case, the light output by LED interact with the lenticular diffuser and undergo lesser color mixing/integration). One skilled in the art will appreciate that the lenticular diffuser enables the integration/mixing of the colors of lights output by the LED and enables imaging of such integration/color mixing (as shown in, e.g., FIG. 3). In contrast, without the lenticular diffuser, the projection device would not be able to attain as much color mixing/integration and visualization of such color mixing/integration (as is apparent when comparing FIG. 3 to FIG. 5B, the latter showing relatively less integration/color mixing).

As described above, however, adjacent pair of LEDs in the LED array may need to be spaced apart to avoid overheating. Accordingly, in some implementations, each adjacent pair of LEDs in the LED array can be arranged to be spaced apart from each other by the minimum amount of space that avoids overheating (e.g., as described above with reference to FIG. 2A) without compromising the ultimate color mixing and homogenization in the light output by the lenticular diffuser.

In summary, the projection device (e.g., projection device 100) could be configured such that the multiple noncoherent light sources 6 (e.g., a 2×2 array of differently-colored LEDs) are positioned at or near the focus or focal plane of the collimating optical element 10 (e.g., a parabolic mirror reflector) and by subsequently positioning the diffuser 14 (e.g., a sinusoidal lenticular diffuser) at or near the output/emergent point of the collimating optical element 10. When so arranged, the light emitted/radiated from the multiple noncoherent light sources and collimated by the collimating optical element 10, results in off axis collimation of the individual LED colors, which image as discrete/individual colors as well as homogenized colors projected out from the collimating optical element (as depicted by the overlapping patterns shown in FIG. 2B). The overlap colors as well as the discrete/individual colors are incidental to the sinusoidal lenticular diffuser, which produces further spatial separation and homogenization of color that is not achieved simply by using the collimating optical element 10 (and without the lenticular diffuser).

Moreover, projecting the homogenized light, as output by the sinusoidal lenticular diffuser into the spatial filter(s) 16, produces a complex mixing of both the discrete LED colors/wavelengths and a color separation of the homogenized light (than what is attainable by a projection device that is implemented with a collimating optical element but no subsequent lenticular diffuser). This complex mixing results in an output image that produces an effect of abstract cloud-like colors.

Another advantage of using a lenticular diffuser is realized by electronically controlling the individual or multiple of the discrete LED colors. Controlling the LEDs in this way produces a wider range of color mixing combinations that are not otherwise attained in projection devices that do not include a lenticular diffuser.

Figure 11A:
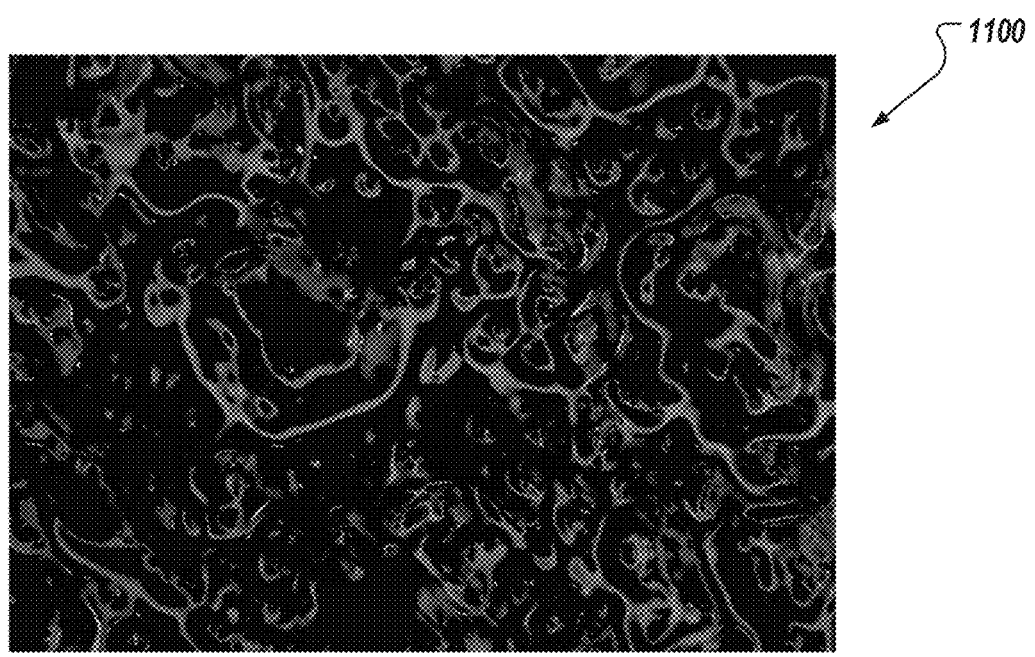
FIG. 11A shows a spatial filter micrograph of a surface of a spatial filter included in a projection device.

FIG. 11A shows a spatial filter micrograph of a surface of a spatial filter 16 included in a projection device 100. The micrograph of the surface of the spatial filter 16 provides a close-up view of the relief structures distributed on the surface of the spatial filter 16. As shown in FIG. 11A, the relief structures are of varying sizes and are distributed non-uniformly on the surface of the spatial filter 16. In some implementations, the relief structures on the surface of the spatial filter 16 can be of the same size and/or can be distributed uniformly on the surface of the spatial filter 16. In some implementations, the relief structures can define refractive patterns.

Figure 11B:
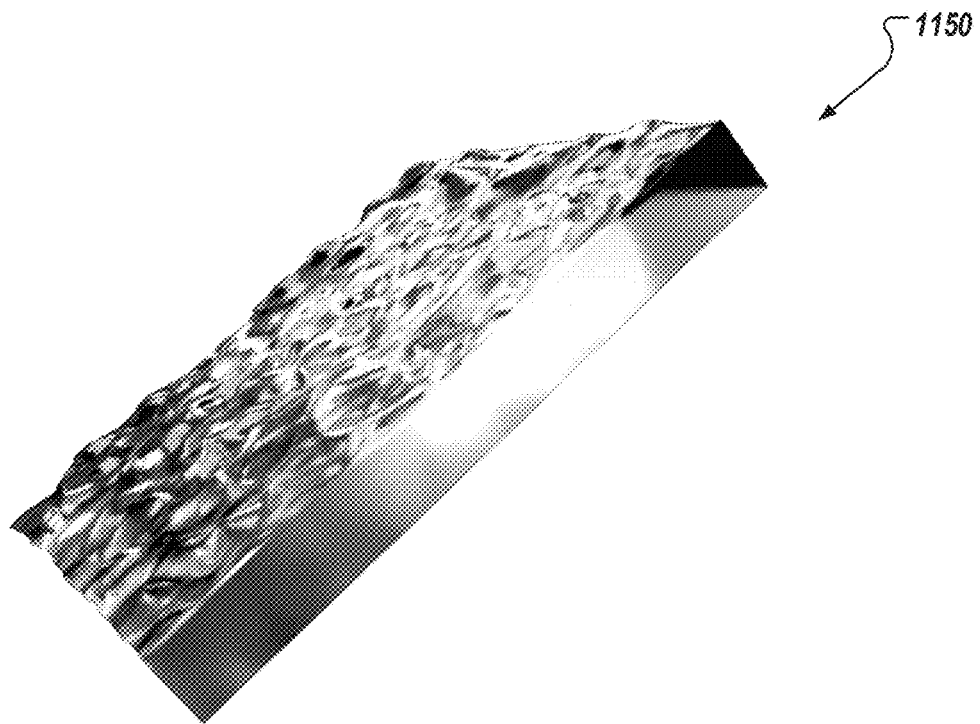
FIG. 11B shows a three-dimensional (3-D) representation of a spatial filter.

FIG. 11B shows a three-dimensional (3D) representation 1150 of a spatial filter 16, showing the relief structures on one surface of the spatial filter.

Figure 13:
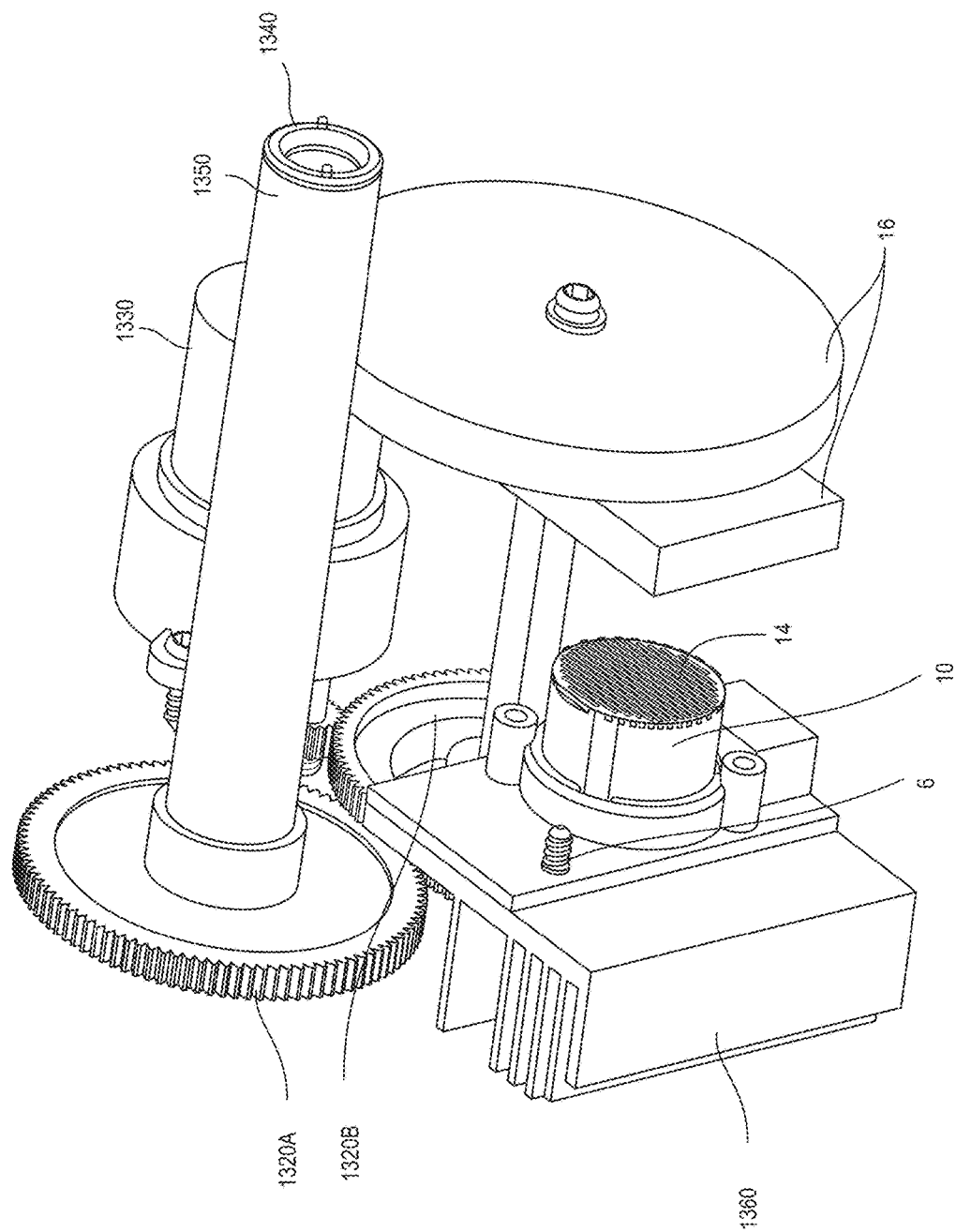
FIG. 13 shows a block diagram of an example arrangement of the components of the projection device of FIG. 1.

FIG. 13 shows a block diagram an example projection device 1300 and the arrangement of the components included therein.

The projection device 1300 is an example of the projection device 100 depicted in and described with reference to FIG. 1. As shown, the projection device 1300 includes certain components that are shown and described in FIG. 1. In particular, the projection device 1300 includes the multiple noncoherent light sources (e.g., LEDs) 6, a collimating optical element (e.g., a parabolic mirror reflector) 10, a sinusoidal lenticular diffuser 14 placed at an output of the collimating optical element 10, and two spatial filters 16 (one rectangular spatial filter and a second rotational spatial filter).

The projection device 1300 also includes a motor 1330 that is coupled to a gear assembly 1320A-1320B (also simply referred to as gear(s) 1320A, 1320B). Gear 1320B is coupled via a shaft to the rotational spatial filter 16 and is configured to rotate the rotational spatial filter 16 when power is supplied to the motor via the power supply (e.g., the power supply 8, as shown in FIG. 1). The rectangular spatial filter is stationary and is not coupled to any gears 1320A-1320B or the motor 1330.

One skilled in the art will appreciate that, in implementations where the projection device includes a motor (e.g., motor 1330), the same power supply can provide power to both the motor and the multiple noncoherent light sources 6. Additionally, one skilled in the art will appreciate that both spatial filters may be connected to the motor 1330 (via a gear assembly, e.g., 1320A-1320B), such that both spatial filters are rotated, translated, or otherwise moved.

As described above with reference to the above figures, the light emitted from the multiple noncoherent light sources 6 traverses/passes through the collimating optical element 10, the lenticular diffuser 14, and the spatial filters 16, and is collected and output by the imaging lens 18 (as shown in FIG. 1) to create a cloud-like effect on the target surface (as shown, e.g., in FIGS. 3-4). The cloud-like effect can have a slow motion because of the periodic rotation of the spatial filter 16 by the motor 1330.

The projection device 1300 also includes a heat sink 1360 positioned adjacent to the noncoherent light sources 6, so as to direct heat away from the heat-generating noncoherent light sources.

The projection device 1300 includes additional components that can collectively generate a star field effect. The star field effect is generated by using one or more coherent light sources (e.g., a laser), which can be provided in any color, positioned at the base of the channel 1350, a diffractive optical element 1340 (e.g., a grating wheel), and the motor 1330, which is coupled to the grating wheel via the gear 1320A. When power is supplied to the laser(s) and the motor 1330, the light beam from the laser(s) is emitted and passes through the channel 1350 (which in turn may include one or more diffractive optical elements). The light output from the channel 1350 (and through the one or more diffractive optical elements, if applicable) passes through the grating wheel, which can be rotated using the motor 1330 and gear 1320A, to generate bright spots because of the interference of the diffracted light beams. The bright spots generated appear as stars (or a field of stars). The periodic rotation of the grating wheel causes the motion of the star field.

In some implementations, the projection device 1300 can include a motor controller coupled to the motor 1330, which can control the speed or rotations-per-minute (RPM) of the motor 1330.

In some implementations, a separate motor and gear assembly can be coupled to each of the spatial filter 16 and the grating wheel 1340.

In some implementations, the combination of components of the projection device 1300 generate the star-field effect that is layered on the cloud-like effect.

In some implementations, the motor is configured to rotate the grating wheel in one direction while rotating or moving the one or more spatial filters in the opposite direction. In such implementations, the projection device outputs a cloud-like effect and a star-field effect that move in opposite directions.

Figure 14A:
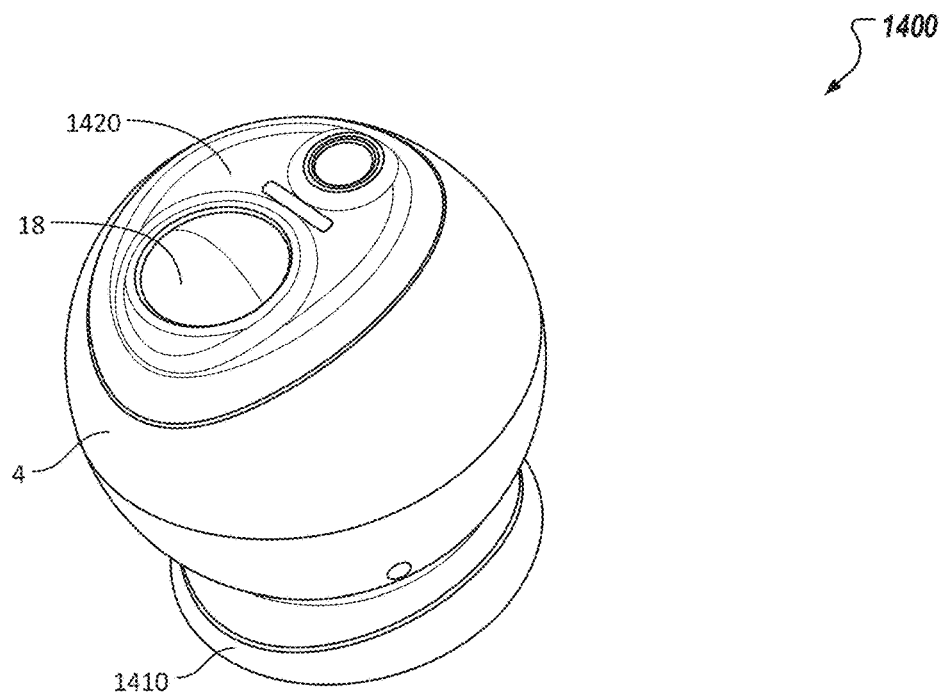
FIGS. 14A and 14B show example external views of the projection device of FIG. 1.

FIG. 14A provides an external view 1400 of an example projection device 100/1300. As shown, the projection device includes a base 1410 and a top portion 1420. The imaging lens 18 of the projection device 100 is depicted at the top portion 1420 of the projection device and is coupled to the housing 4 of the projection device. The other components of the projection device, which are described and depicted in FIG. 1 (e.g., components 6, 8, 10, 12, 14, 16) and in FIG. 13, are included within the housing 4 of the projection device 100. The housing 4 can be constructed of any suitable material for housing optical components, including but not limited to metal, plastic, glass, etc.

Figure 14B:
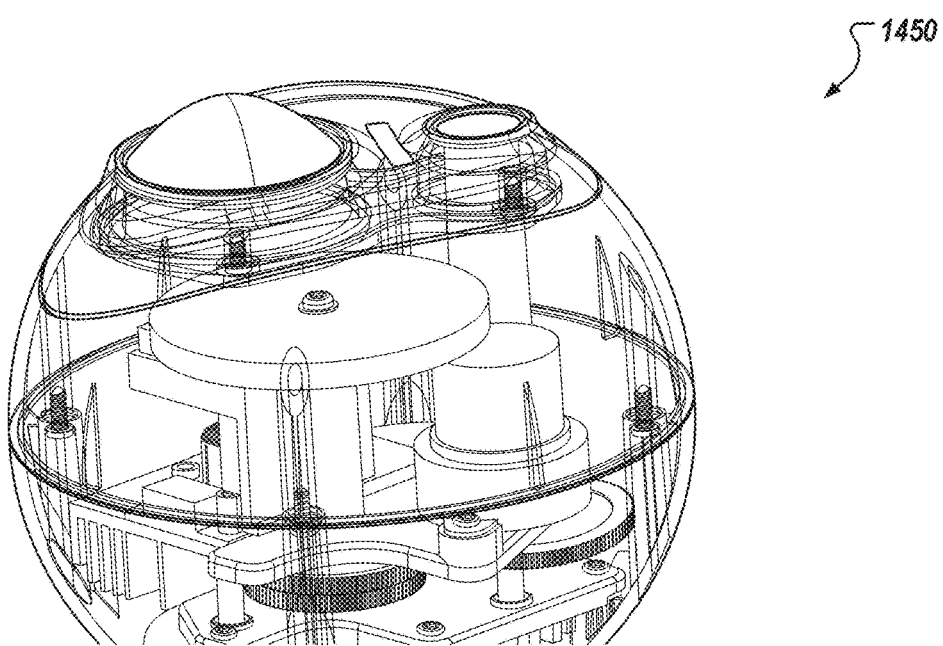

FIG. 14B provides an example external view 1450 of the projection device 100. The external view 1450 is similar to the external view 1400. The external view 1450 additionally provides a visualization of how the components of the projection device 100 (e.g., components 6, 8, 10, 12, 14, 16) are arranged within the projection device 100 (or projection device 1300). This visualization of the internal components of the projection device 100/1300 is for illustration purposes only.

A method for arranging the components of a projection device (such as the projection device 100) is provided below. The below listing of steps is for illustration only and is not intended to require or define the order in which the steps are to be performed. Thus, although the below method may be performed by performing the steps in the order listed below, the method could also be performed by following the below steps in a different order.

At step 1, a collimating optical element is positioned within a housing of the projection device. As described in FIGS. 1-14, the collimating optical element can be a parabolic mirror reflector or a refractive lens system.

At step 2, and as shown in FIG. 1, multiple noncoherent light sources (e.g., LEDs) are positioned at or near a focus or focal plane of the collimating optical element. As described in FIGS. 1 and 2A-2B, the LEDs can be provided in any suitable arrangement (e.g., an array) and can be of different colors.

At step 3, and as shown in FIG. 1, a planar diffuser is positioned (1) at or near a focus or focal plane of the collimating optical element and (2) between the multiple noncoherent light sources and the collimating optical element. As described above, the projection device may not include a planar diffuser, in which case, this step would not need to be performed when arranging the components of the projection device.

At step 4, and as shown and described with reference to FIGS. 1, 8, and 12A-12B, a lenticular diffuser (e.g., a 1D or 2D sinusoid lenticular diffuser or another lenticular diffuser with a different configuration (e.g., a half wave design)) is positioned at or near the output of the collimating optical element's output. As described above, in implementations where the collimating optical element is a parabolic mirror reflector, this parabolic mirror reflector, the planar diffuser, and the lenticular diffuser can be manufactured as a single component.

At step 5, and as shown and described with reference to FIGS. 1,10, and 11A-11B, one or more spatial filters are positioned adjacent to the lenticular diffuser. When more than one spatial filter is deployed in the projection device, the spatial filters can be arranged in sequence. As described above, a motor can be included in the projection device's housing and can be coupled to a gear assembly, which in turn is coupled to one or more spatial filters (as shown and described with reference to FIGS. 1 and 13).

At step 6, an imaging lens is coupled to the housing and positioned adjacent to the last spatial filter in the sequence of spatial filters. As described above, the spacing between the last spatial filter and the imaging lens can be modified to achieve the desired image magnification to be output on a target surface.

It is understood that the present subject matter may be embodied in many different forms and should not be construed as being limited to the embodiments set forth herein. Rather, these embodiments are provided so that this subject matter will be thorough and complete and will fully convey the disclosure to those skilled in the art. Indeed, the subject matter is intended to cover alternatives, modifications and equivalents of these embodiments, which are included within the scope and spirit of the subject matter as defined by the appended claims. Furthermore, in the following detailed description of the present subject matter, numerous specific details are set forth in order to provide a thorough understanding of the present subject matter. However, it will be clear to those of ordinary skill in the art that the present subject matter may be practiced without such specific details.

Aspects of the present disclosure are described herein with reference to block diagrams or images of apparatuses (systems) and devices according to embodiments of the disclosure. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described in order to best explain the principles of the disclosure and the practical application, and to enable others of ordinary skill in the art to understand the disclosure with various modifications as are suited to the particular use contemplated.

While this specification contains many specific implementation details, these should not be construed as limitations on the scope of any features or of what may be claimed, but rather as descriptions of features specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

The invention claimed is:

1. A projection device, comprising:
a housing; and
a plurality of components included within the housing, the plurality of components comprising a plurality of light emitting diodes (LEDs), a parabolic mirror reflector, a sinusoidal lenticular diffuser, and a plurality of spatial filters, wherein:
the plurality of LEDs are provided in at least two distinct colors;
the parabolic mirror reflector is arranged to collimate light received from the plurality of LEDs;
the sinusoidal lenticular diffuser positioned at an output of the parabolic mirror reflector and arranged to diffuse the collimated light received from the parabolic mirror reflector;
the plurality of spatial filters are arranged to diffuse the diffused and collimated light received from the sinusoidal lenticular diffuser, wherein each of the plurality of spatial filters has a first surface on which a plurality of relief structures are distributed; and
an imaging lens coupled to the housing, wherein the imaging lens is arranged to magnify the diffused light received from the plurality of spatial filters and display a cloud-like effect on a first surface.

2. The projection device of claim 1, further comprising:
a planar diffuser that is positioned between the plurality of LEDs and the parabolic mirror reflector, wherein the planar diffuser is arranged to diffuse light received from the plurality of noncoherent light sources and direct the diffused light toward the parabolic mirror reflector.

3. The projection device of claim 2, wherein the plurality of LEDs are arranged in an array, with each adjacent pair of LEDs being separated by an interstitial gap.

4. The projection device of claim 3, wherein the interstitial gap is 0.25 mm.

5. The projection device of claim 2, wherein both the planar diffuser and the plurality of LEDs are positioned at the focus or focal plane of the collimating optical element.

6. The projection device of claim 1, wherein each spatial filter in the spatial filter comprises one of: a transmissive filter, a refractive filter, a reflective filter, or a diffractive filter.

7. The projection device of claim 1, further comprising a motor coupled to at least one spatial filter in the plurality of spatial filters and configured to move the at least one spatial filter, wherein moving the at least one spatial filter causes movement in the cloud-like effect displayed by the imaging lens.

8. The projection device of claim 7, wherein the housing further comprising a first diffractive optical element and a coherent light source and wherein:
the motor is coupled to the first diffractive optical element and is configured to rotate the first diffractive optical element; and
the at least one coherent light source arranged to direct light from coherent light source through the first diffractive optical element, to generate a star-field effect for display on the first surface.

9. The projection device of claim 7, further comprising a second diffractive optical element and wherein:
the first diffractive optical element is a grating wheel; and
the second diffractive optical element is positioned between the at least one coherent light source and the grating wheel, wherein light output by the at least one coherent light source passes through the second diffractive optical element and the grating wheel.

10. The projection device of claim 1, wherein the imaging lens is a condenser lens.

11. The projection device of claim 1, wherein the sinusoidal lenticular diffuser is one-dimensional or two-dimensional, and is positioned at an output of the parabolic mirror reflector.

12. The projection device of claim 1, wherein each of the plurality of spatial filters has a first surface on which a plurality of relief structures are distributed, wherein the plurality of relief structures have varying sizes.

13. A projection device comprising:
a plurality of noncoherent light sources, wherein the plurality of noncoherent light sources are provided in at least two distinct colors;
a collimating optical element that is arranged to collimate light received from the plurality of noncoherent light sources;
a lenticular diffuser positioned at an output of the collimating optical element and arranged to diffuse the collimated light received from the collimating optical element;
at least one spatial filter that is arranged to diffuse the diffused and collimated light received from the lenticular diffuser; and
a lens that is arranged to magnify the diffused light received from the at least one spatial filter and display the magnified light on a first surface.

14. The projection device of claim 13, further comprising:
a second diffuser, wherein the second diffuser is positioned between the plurality of noncoherent light sources and the collimating optical element, and wherein the second diffuser is arranged to diffuse light from the plurality of noncoherent light sources and direct the diffused light toward the collimating optical element.

15. The projection device of claim 13, wherein the lenticular diffuser is a one-dimensional or two-dimensional, sinusoidal lenticular diffuser.

16. The projection device of claim 13, wherein the plurality of noncoherent light sources are a plurality of light emitting diodes (LEDs).

17. The projection device of claim 16, wherein the plurality of LEDs are arranged in an array, with each adjacent pair of LEDs being separated by an interstitial gap.

18. The projection device of claim 13, where the collimating optical element is a parabolic mirror reflector or a refractive lens.

19. The projection device of claim 13, where the at least one spatial filter includes a plurality of spatial filters.

20. The projection device of claim 13, wherein the at least one spatial filter comprises a transmissive filter, a refractive filter, a reflective filter, or a diffractive filter.

21. The projection device of claim 13, further comprising a motor coupled to and configured to move the at least one spatial filter.

22. The projection device of claim 21, further comprising a gear assembly coupled to the motor to move the at least one spatial filter.

23. The projection device of claim 21, further comprising a first diffractive optical element and a coherent light source, wherein:

the motor is coupled to the first diffractive optical element and is configured to rotate the first diffractive optical element; and the at least one coherent light source is arranged to direct light from coherent light source through the first diffractive optical element, to generate a star-field effect for display on the first surface.

24. The projection device of claim 23, further comprising a second diffractive optical element and wherein:

the first diffractive optical element is a grating wheel; and the second diffractive optical element is positioned between the at least one coherent light source and the grating wheel, wherein light output by the at least one coherent light source passes through the second diffractive optical element and the grating wheel.

25. The projection device of claim 13, wherein the second diffuser is a planar diffuser and wherein the planar diffuser is positioned at or near the focus or focal plane of the collimating optical element.

* * * * *